(12) United States Patent
Hoffman et al.

(10) Patent No.: US 7,539,135 B1
(45) Date of Patent: May 26, 2009

(54) SYSTEM AND METHOD FOR ESTABLISHING TELECOMMUNICATION CARRIER VIRTUAL NETWORKS

(75) Inventors: Bruce E. Hoffman, Overland Park, KS (US); Peter H. Distler, Overland Park, KS (US); Durga Prasad Satapathy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1104 days.

(21) Appl. No.: 10/439,586

(22) Filed: May 16, 2003

(51) Int. Cl.
    *G01R 31/08* (2006.01)
(52) U.S. Cl. ............... 370/230; 370/236; 709/218; 709/219
(58) Field of Classification Search ............ 370/395.53, 370/230, 236; 709/218, 219
    See application file for complete search history.

(56) References Cited

U.S. PATENT DOCUMENTS

| | | | |
|---|---|---|---|
| 6,434,156 B1 * | 8/2002 | Yeh | 370/401 |
| 6,452,924 B1 * | 9/2002 | Golden et al. | 370/352 |
| 6,678,248 B1 | 1/2004 | Haddock | |
| 7,023,860 B1 * | 4/2006 | Mauger | 370/401 |
| 2002/0004827 A1 | 1/2002 | Ciscon | |
| 2002/0052915 A1 | 5/2002 | Amin-Salehi | |
| 2002/0174207 A1 | 11/2002 | Battou | |
| 2003/0117954 A1 | 6/2003 | De Neve et al. | |
| 2003/0123446 A1 | 7/2003 | Muirhead et al. | |
| 2003/0227915 A1 * | 12/2003 | Brahim | 370/389 |
| 2004/0081172 A1 | 4/2004 | Ould-Brahim | |
| 2004/0165605 A1 | 8/2004 | Nassar | |
| 2004/0181476 A1 | 9/2004 | Smith | |
| 2006/0248205 A1 | 11/2006 | Randle | |

OTHER PUBLICATIONS

Notice of Allowance in U.S. Appl. No. 10/439,590, filed May 16, 2003, entitled "Network System Manager For Telecommunication Carrier Virtual Networks," 8 pp.
Notice of Allowance in U.S. Appl. No. 10/697,396, filed Oct. 30, 2003, entitled "System and Method For Establishing a Carrier Virtual Network Inverse Multiplexed Telecommunication Connection," 3 pp.
International Telecommunication Union, Telecommunication Standardization Sector, Text for Y.11vpnsdr Draft Recommendation on Layer1 Virtual Private Network Generic Requirements and Architectures, study Period 2001-2004.

* cited by examiner

*Primary Examiner*—Seema S. Rao
*Assistant Examiner*—Sai-Ming Chan

(57) ABSTRACT

The present invention is a system and method for establishing layer one telecommunication carrier virtual networks. In accordance with the present invention, at least one portion of layer one resources of at least one telecommunication network is dedicated to at least one carrier virtual network. The at least one portion of layer one resources dedicated to each carrier virtual network may be identified to the one or more telecommunication networks that may access that carrier virtual network. Each telecommunication network that may access a carrier virtual network may then access the portions of layer one resources dedicated to that carrier virtual network for establishing a service, provisioning a service, or otherwise managing those layer one resources.

23 Claims, 15 Drawing Sheets

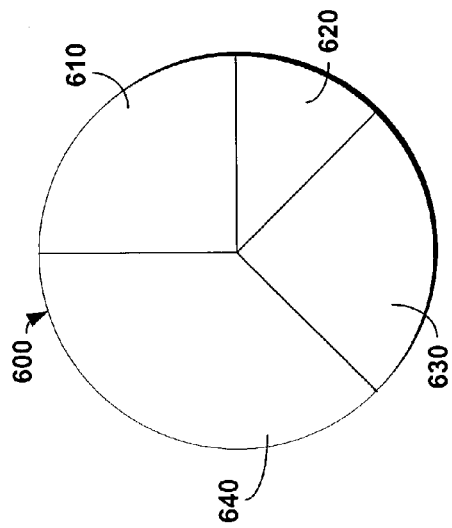
FIG. 6.
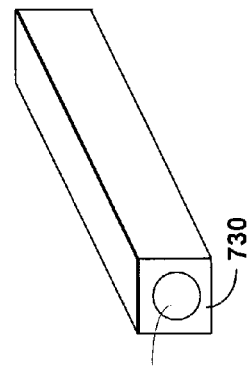
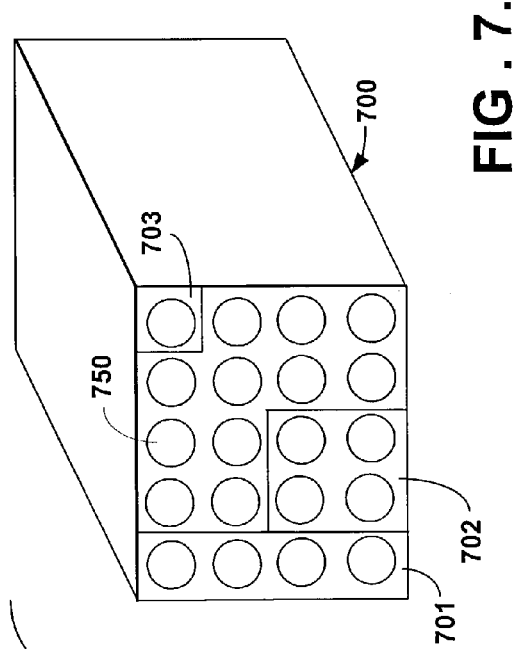
FIG. 7.
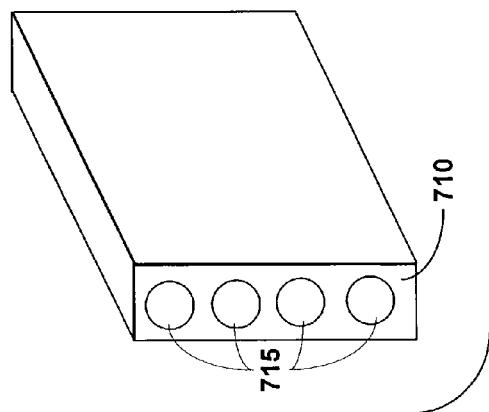

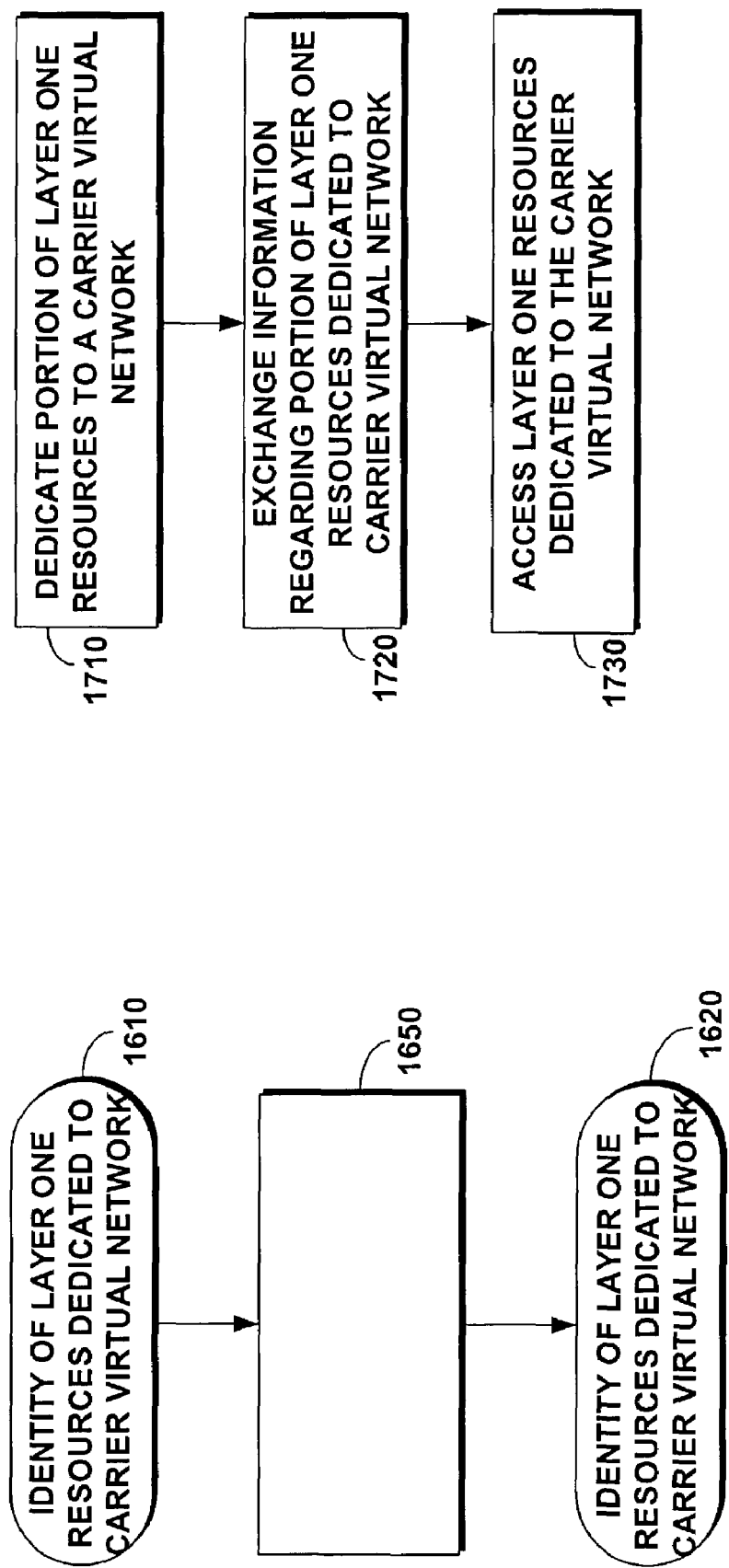

SYSTEM AND METHOD FOR ESTABLISHING TELECOMMUNICATION CARRIER VIRTUAL NETWORKS

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to telecommunications. More particularly, the present invention relates to the establishment of carrier virtual networks to allow telecommunication service providers to access and manage secure, partitioned layer one telecommunication resources of other telecommunication service providers, and vice versa, thereby better using underutilized telecommunication resources and improving the reach and service of participating telecommunication service providers.

BACKGROUND OF THE INVENTION

The telecommunication industry in the United States, as well as abroad, faces a unique set of circumstances. The telecommunication industry as a whole suffers from an over capacity of installed telecommunication resources. Yet despite this over capacity, every telecommunication service provider, however, is exposed to service requests in specific cities, countries, or regions of the world where it has available less than adequate managed telecommunication resources to deliver the requested services to customers.

The problem of over capacity of telecommunication resources arises most markedly at layer one of the telecommunication hierarchy. Layer one telecommunication resources have been deployed beyond the level the market place presently requires and beyond the level reasonably expected to be necessary in the near future. Layer one resources are the physical resources, such as copper lines, coaxial cables, fiber circuits, wireless bandwidth, digital cross connects, optical switches, electrical switches, and other physical resources used to provide telecommunication services. At present, installed layer one telecommunication resources drastically exceed the needed resources in many areas. The excess layer one resources include completely unused resources, such as unused optical fiber typically referred to as "dark fiber." Excess layer one resources also include resources that are in use but under utilized, such as transmission facilities like optical fiber that has been "lit", meaning equipped and put in use, but that is being used at well below its possible capacity. Excess layer one resources represent a significant investment for telecommunication service providers—an investment that in many instances provides little or no return and questionable prospect of returns in the foreseeable future.

The problem of under capacity of telecommunication resources most often relates to the lack of layer one resources within particular markets or geographical areas for a particular telecommunication service provider in need of such resources to provide service to customers. While a particular telecommunication service provider's resources may be under utilized in at least some markets, the service provider may lack resources in other markets where it needs such resources to provide services to its customers. Faced with such a situation, the telecommunication service provider historically had to choose between not offering the service needed by a customer, incurring the expense of deploying additional layer one resources to service that customer, or acquiring access to unmanaged layer one resources from other telecommunication service providers with resources deployed in the market. Frequently, none of those options are desirable or available within timelines acceptable to the customer and the telecommunication service provider involved.

A decision to not provide services needed by a customer is obviously damaging to both the customer and the telecommunication service provider. Such a course leaves the customer without needed services, and the customer must then pursue alternative arrangements to meet its telecommunication needs. The telecommunication service provider that declines to provide services loses possible revenue and risks harming a customer relationship. A telecommunication customer in this situation may ultimately obtain services from multiple telecommunications providers. This can increase the total cost of telecommunication services to the customer, and will almost always increase the complexity of the customer's telecommunications operations. While few would prefer such a situation, this is often forced upon customers if a single telecommunications provider cannot provide that customer with all telecommunication services required for its various locations. Clearly, simply not providing service to a customer when a telecommunication service provider lacks the layer one resources needed to provide the service is unappealing.

It may seem that the most straight forward way for a telecommunication service provider to provide services to a customer needing services for which the service provider lacks required layer one resources is to simply physically deploy the required layer one resources. Several obstacles prevent this seemingly simple solution from being feasible in most circumstances. First, the time required to deploy the required layer one resources often far exceeds the time frame within which a customer needs the service. Second, the cost of deploying the resources often greatly exceeds the revenues likely to be received by the telecommunication service provider from the customer for the needed services. Third, once the layer one resources are deployed they are likely to be under utilized and, therefore, unprofitable for the telecommunication service provider. For these and other reasons, deploying additional layer one resources to meet a customer's service needs is frequently impractical for both the customer and the telecommunication service provider.

Given the unsatisfactory nature of simply not providing a customer a service it needs and the impracticality of deploying the layer one resources required to provide a customer a service it needs, a telecommunication service provider may seek to access the layer one resources of another telecommunication service provider to provide the customer the needed service. If, as is often the case, a telecommunication service provider has deployed layer one resources in an area, another service provider needing to provide services in that area may seek to access those excess layer one resources to provide a service to a customer. Historically, the layer one resources acquired in this fashion had no systemic management capabilities extended with them. The acquired layer one resources were, essentially, an unmanaged capacity acquisition. While understood within the industry, acquiring such access and providing service to a customer using the resources of another telecommunication service provider is not a simple task.

First, determining what layer one telecommunication resources are available to be accessed in an area and which telecommunication service provider owns those resources is generally manual in nature, process intensive, and time consuming. The network management systems of a service provider's own telecommunication network can readily identify layer one resources are available within that network, but those network management systems cannot identify the layer one resources of other service providers' that are potentially available. Often, identifying what layer one resources may be available from other telecommunication service providers may depend upon the personal knowledge of technicians in an area or a search of public records. Once possible layer one resources in another service provider's telecommunication network are identified, through whatever method, a request to access those resources must be made. After a request to access resources has been made, the telecommunication service provider that owns the requested layer one resources must determine the availability of those resources for access by the requester and determine the terms for that access. Evaluating such a request for access can be complicated by technical issues, business considerations, and extensive government regulation of the telecommunication industry. Even under the best of circumstances, evaluating and responding to a request from another telecommunication service provider to access layer one telecommunication resources can be a time consuming process.

Even if a service can ultimately be provided to a customer using another telecommunication service provider's layer one resources, the need to make individual inquiries to determine the availability of the layer one telecommunication resources of another telecommunication service provider drastically slows the process of establishing service to a customer, as the process of obtaining access must necessarily be completed before a connection can be made using those resources. The need to utilize resources from other service providers also complicates the provisioning process of the telecommunication service provider from being performed, which if not implemented properly can often be even more problematic to a customer than a delay in commencing the needed service. Provisioning refers to the process whereby a telecommunication service provider determines how to route a needed telecommunication connection, determines specific equipment (e.g. multiplexers, digital cross connect systems, etc.) and specific ports to be used, confirms available capacity end-to-end, and tests that connection before establishing it for the customer. Because the telecommunication service provider requesting access to another's layer one resources cannot access those resources and does not know what resources will be made available to it, the provisioning process cannot begin until arrangements have been made for accessing the layer one resources. Without all the information required to provision a requested connection, a telecommunication service provider cannot reliably inform a customer of the cost of the requested service, or even confirm that the requested service is possible. Thus, the customer must wait, often an indeterminate amount of time, not only for a telecommunication service to be provided, but also even for confirmation that the service is possible and what the service will cost. Indeed, difficulties such as these in even providing basic details about a requested service contribute to an unflattering caricature of telecommunication service providers. At a minimum, this delay and uncertainty frustrates customers and interferes with their business.

The result of the above described situation is problematic for both telecommunication service providers and their customers. Despite a general over capacity, even a glut, of deployed layer one telecommunication resources, the resources needed to provide services needed by customers are often not readily available when needed by a particular service provider in a particular market. While an under utilized high bandwidth capacity fiber may be proximate to a customer location, that fiber is often operated by another service provider, one that is not the customer's choice to meet its telecommunication needs. Simply switching to a different telecommunication service provider will often only change the location of the problem, as all telecommunication service providers suffer from limited reach in some areas and markets. As business and life increasingly become global, the problem of limited reach becomes increasingly problematic, with customers needing telecommunication services not only in multiple regions of one country, but also in multiple countries and even multiple continents. Thus, a customer faces a host of mostly access-limited telecommunication service choices, and telecommunication service providers struggle with the paradoxical twin dilemmas of simultaneous over capacity and under capacity of layer one telecommunication resources.

The need exists, therefore, for a system and method for allowing telecommunication providers to quickly, reliably, and conveniently access and manage the under utilized layer one resources of other telecommunication service provider's networks. Such a system should preferably allow for the easy provisioning of a connection and should be transparent to the ultimate customer.

BRIEF SUMMARY OF THE INVENTION

The present invention establishes a carrier virtual network that extends the effective reach of telecommunication service providers' networks and allows for the use of under utilized and unutilized layer one telecommunication resources of other service providers' networks. A carrier virtual network in accordance with the present invention allows a telecommunication network to access in a systemically managed manner the layer one resources of another telecommunication network to provide telecommunication services. The carrier virtual network in accordance with the present invention may be established by dedicating one or more portions of the layer one telecommunication resources of a telecommunication network to the carrier virtual network. Thereafter, the layer one resources dedicated to the carrier virtual network may be systemically accessed by a telecommunication service provider that may access the carrier virtual network as if those layer one resources were part of the service provider's own telecommunication network. In a similar fashion, portions of layer one resources from multiple telecommunication networks may be dedicated to a single carrier virtual network.

BRIEF DESCRIPTION OF THE SEVERAL VIEWS OF THE DRAWING

The present invention is described in detail below with reference to the attached drawing figures, wherein;

FIG. 6 is a schematic illustration of the dedication of portions of layer one resources to carrier virtual networks;

FIG. 7 is a schematic illustration of the dedication of a layer one device to a carrier virtual network;

FIG. 16 is a schematic illustration of data flow in and out of carrier virtual network system manager;

FIG. 17 is a flow diagram of one method for forming a carrier virtual network.

DETAILED DESCRIPTION OF THE INVENTION

Figure 1:
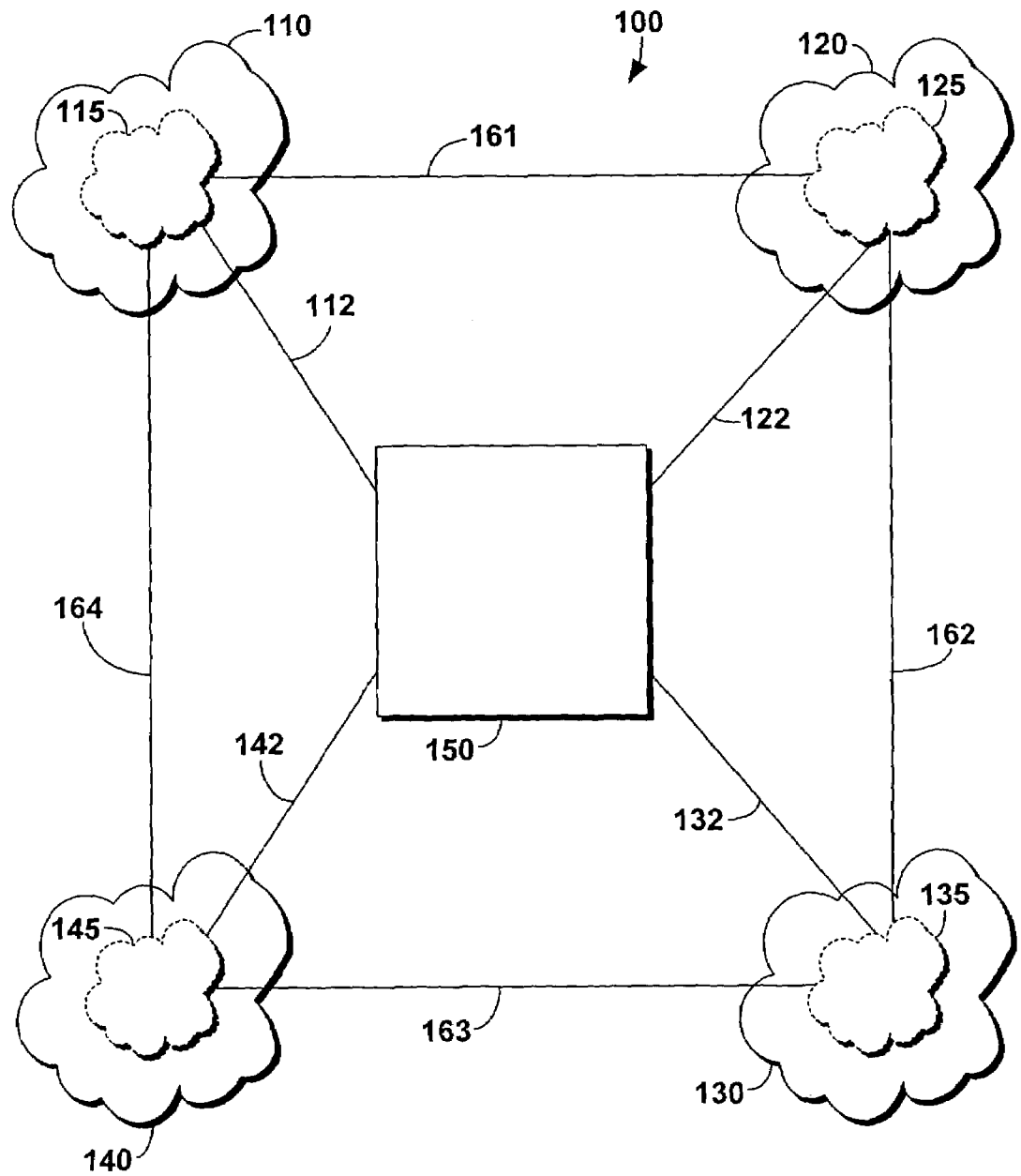
FIG. 1 is a schematic illustration of a carrier virtual network comprised of portions of layer one resources dedicated to the carrier virtual network from four telecommunication networks.

The present invention allows unutilized or under utilized layer one telecommunication resources of one telecommunication network to be accessed and securely managed by another telecommunication network by creating carrier virtual networks. A carrier virtual network is a network of shared layer one telecommunication resources that are logically divided into discreet networks for different users. Telecommunication networks are often envisioned in various layers, with layer one being the layer of actual hardware, such as cables, optical/electrical switches, and add/drop multiplexers, with ascending layers representing communications protocols and, ultimately, the users of the network.

In accordance with the present invention, a portion of the layer one resources of a telecommunication network are dedicated to a carrier virtual network that may be accessed and managed by another telecommunication provider. While the layer one resources dedicated to a carrier virtual network may be expected to be excess layer one resources, this need not be the case.

One simple arrangement of a carrier virtual network in accordance with the present invention that is useful for illustrative purposes involves two telecommunication networks of different geographical scope. A portion of the layer one resources of each of the telecommunication networks are dedicated to a partitioned carrier virtual network that may be accessed and securely managed by the other telecommunication service provider. In this scenario, each telecommunication service provider would expand the geographical scope of services it could offer, without the cost and uncertainty of physically deploying additional layer one resources.

Of course, implementations of the present invention are likely to vary considerably from the basic example above. For example, one telecommunication service provider may enter into arrangements to create a carrier virtual network with multiple telecommunication networks owned by other telecommunication service providers. In this instance, the first telecommunication service provider would effectively expand its telecommunication network to include portions of the layer one resources of multiple other telecommunication networks. Thus, multiple portions of layer one resources from multiple telecommunication networks are combined into a single carrier virtual network that maybe accessed by a single telecommunication network.

Another possible scenario is the creation of pooled layer one resources from multiple telecommunication networks. These resources would be assigned to a non-dedicated carrier virtual network pool that would be accessible for acquisition by all carrier virtual network service providers' customers. In this scenario, a portion of the layer one resources of each telecommunication network is dedicated to a single carrier virtual network accessible by telecommunication networks that dedicated layer one resources to the carrier virtual network. Alternately, access to the pooled layer one resources dedicated to the carrier virtual network may be granted to telecommunication networks that do not contribute resources to the pool in exchange for suitable access fees.

It should be noted that the process whereby telecommunication service providers agree to form carrier virtual networks in accordance with the present invention is immaterial. Likewise, now telecommunication service providers participating in a carrier virtual network allocated access rights is immaterial to the present invention. Telecommunication service providers may pursue arrangements to establish and maintain carrier virtual networks in any fashion without departing from the scope of the present invention.

A carrier virtual network in accordance with the present invention may facilitate the provisioning of a service for a customer by establishing the network availability prior to the placement of an order by a customer. For example, a first telecommunication service provider and a second telecommunication service provider may form carrier virtual networks allowing each to access a portion of the other's layer one resources. At the formation of the network, and possibly at subsequent times, each service provider would identify to the other those layer one resources in its own telecommunication network that are dedicated to the carrier virtual network accessible to the other network. This process of identifying layer one resources that are dedicated to the carrier virtual network may involve providing to the network system manager of the other telecommunication network information regarding the portion of layer one resources dedicated to the carrier virtual network to enable the other telecommunication service provider to manage those resources as if they were part of its own network. The layer one resources dedicated to the carrier virtual network would appear to customers and those performing provisioning for the telecommunication service provider as portions of its own telecommunication network. Accordingly, a participating telecommunication service provider could immediately ascertain whether a particular customer request can be fulfilled using the carrier virtual network, without having to engage the second telecommunication service provider to determine whether it will provide access to its layer one resources in an acceptable fashion. These and other broad aspects of the present invention are further illustrated in the attached figures.

Referring now to FIG. 1, a schematic diagram of a carrier virtual network comprised of portions of layer one resources dedicated to the carrier virtual network from four telecommunication networks is illustrated. A first telecommunication network 110 dedicates a first portion 115 of layer one resources to the carrier virtual network. A second telecommunication network 120 dedicates a second portion 125 of its layer one resources to the carrier virtual network. A third telecommunication network 130 dedicates a third portion 135 of layer one resources to the carrier virtual network. A fourth telecommunication network 140 dedicates a fourth portion 145 of layer one resources to the carrier virtual network. A first network connection 161 links the first telecommunication network 110 and the first portion 115 to the second telecommunication network 120 and the second portion 125. A second network connection 162 links the second telecommunication network 120 and the second portion 125 to the third telecommunication network 130 and the third portion 135. A third network connection 163 links the third telecommunication network 130 and the third portion 135 to the fourth telecommunication network 140 and the fourth portion 145. A fourth network connection 164 links the fourth telecommunication network 140 and the fourth portion 145 to the first telecommunication network 110 and the first portion 115. The first network connection 161, the second network connection 162, the third network connection 163, and the fourth network connection 164 are means that allow a telecommunication network that may access the carrier virtual network to access portions of layer one resources dedicated to the carrier virtual network. While the first network connection 161, the second network connection 162, the third network connection 163, and the fourth network connection 164 may often be a high bandwidth optical fiber, any other type of connection, including wireless, may be used. It should be noted that multiple network connections and parts of the carrier virtual network itself may constitute a means for a telecommunication network to access a portion of layer one resources dedicated to a carrier virtual network. For example, as shown in FIG. 1 the first telecommunication network 110 may access the third portion 135 using the first network connection 161, the second network connection 162, and an appropriate connection formed through the second portion 125. Further, it should be realized that more network connections than the four illustrated in FIG. 1 may be employed, and that those network connections may connect any telecommunication network with access to the carrier virtual network to any portion of layer one resources dedicated to the carrier virtual network.

The first telecommunication network 110 and the portion 115 dedicated to the carrier virtual network are connected to a carrier virtual network system manager 150 through a first dedicated connection 112. The second telecommunication network 120 and the second portion 125 dedicated to the carrier virtual network are connected to carrier virtual network system manager 150 through a second dedicated connection 122. The third telecommunication network 130 and the third portion 135 dedicated to the carrier virtual network are connected to the carrier virtual network system manager 150 through a third dedicated connection 132. The fourth telecommunication network 140 and the fourth portion 145 dedicated to the carrier virtual network are connected to the carrier virtual network system manager 150 through a fourth dedicated connection 142.

The carrier virtual network system manager 150 maintains information regarding the layer one resources dedicated to the carrier virtual network. For example, the carrier virtual network system manager 150 maintains information identifying the layer one resources of the first portion 115, the second portion 125, the third portion 135, and the fourth portion 145. As shall be described more fully below, the carrier virtual network system manager 150 interfaces with participating telecommunication networks to receive information regarding the layer one resources dedicated to the carrier virtual network from networks dedicating those resources and to provide that information to the telecommunication networks that may access the carrier virtual network. Additional aspects of various embodiments of a carrier virtual network system manager 150 will be discussed below. A carrier virtual network may be established and maintained without the use of a carrier virtual network system manager 150 by, for example, directly exchanging information regarding the portions of layer one resources dedicated to a carrier virtual network between telecommunication networks. If the carrier virtual network system manager 150 is omitted, the network system managers that manage each participating telecommunication network may transmit and receive information regarding the portions of layer one resources dedicated to the carrier virtual network. However, differences between the network system managers of different telecommunication networks may hamper the exchange of such information. Also, network system managers may not be designed to exchange such information. For these reasons, the use of a carrier virtual network system manager may facilitate the establishment and maintenance of a carrier virtual network.

Figure 2:
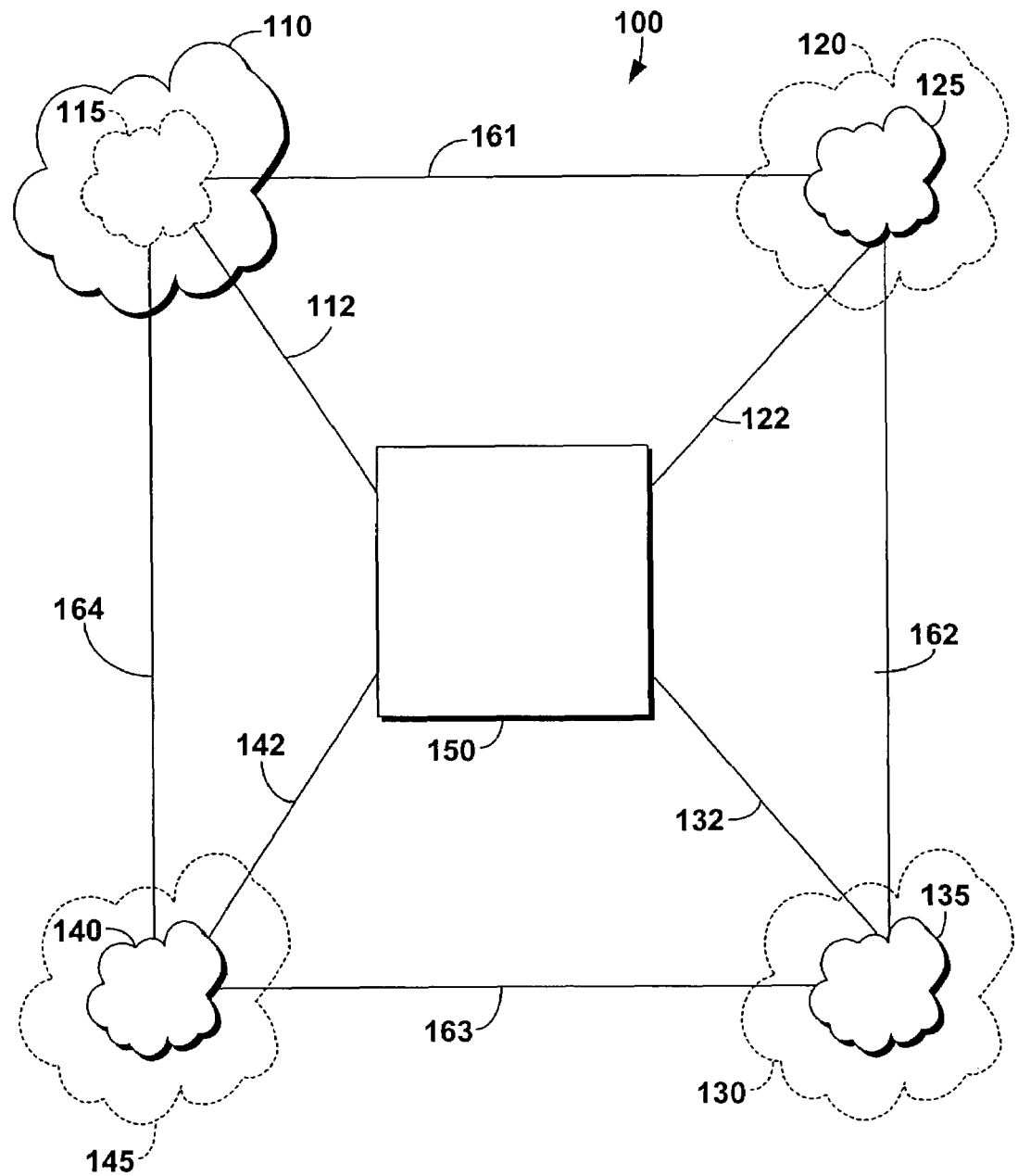
FIG. 2 is a schematic illustration of the apparent network available to a user of a telecommunication network by accessing layer one resources dedicated to a carrier virtual network.

Referring now to FIG. 2, the apparent network available to a user of the first telecommunication network 110 is illustrated. The customer wishing to utilize the resources of the first telecommunication network would, of course, have available to it the resources of the first telecommunication network 110. However, because of the carrier virtual network the customer may receive services using the second portion 125 of the second telecommunication network 120, the third portion 135 of the third telecommunication network 130, and the fourth portion 145 of the fourth telecommunication network 140. From the perspective of a customer using the first telecommunication network 110, or for the first telecommunication service provider provisioning an order from a customer, the first telecommunication network 110 includes the additional layer one network resources made available to it via the carrier virtual network. The situation is similar for the second telecommunication network 120, the third telecommunication network 130, and the fourth telecommunication network 140, each of which is able to expand its available resources to include the portions of the other telecommunication networks dedicated to the carrier virtual network.

In further reference to FIG. 1 and FIG. 2, it should be understood that the first telecommunication network 110, the second telecommunication network 120, the third telecommunication network 130, and the fourth telecommunication network 140 may be, at least in part, geographically coextensive. For example, any number of telecommunication networks involved in a carrier virtual network may serve a given market or geographical area. It should also be appreciated that FIG. 1 and FIG. 2 illustrate the present invention schematically at a high level. The specific layer one resources dedicated to a carrier virtual network are not illustrated, and could include any layer one resources in a telecommunication network. For example, layer one resources dedicated to a carrier virtual network in accordance with the present invention may include, but are not limited to, telecommunication cable, telecommunication optical/electrical switches, telecommunication digital cross connect routers, and mobile telecommunication bandwidth. Of course, not every possible layer one resource need be included in any given carrier virtual network in accordance with the present invention.

Figure 3:
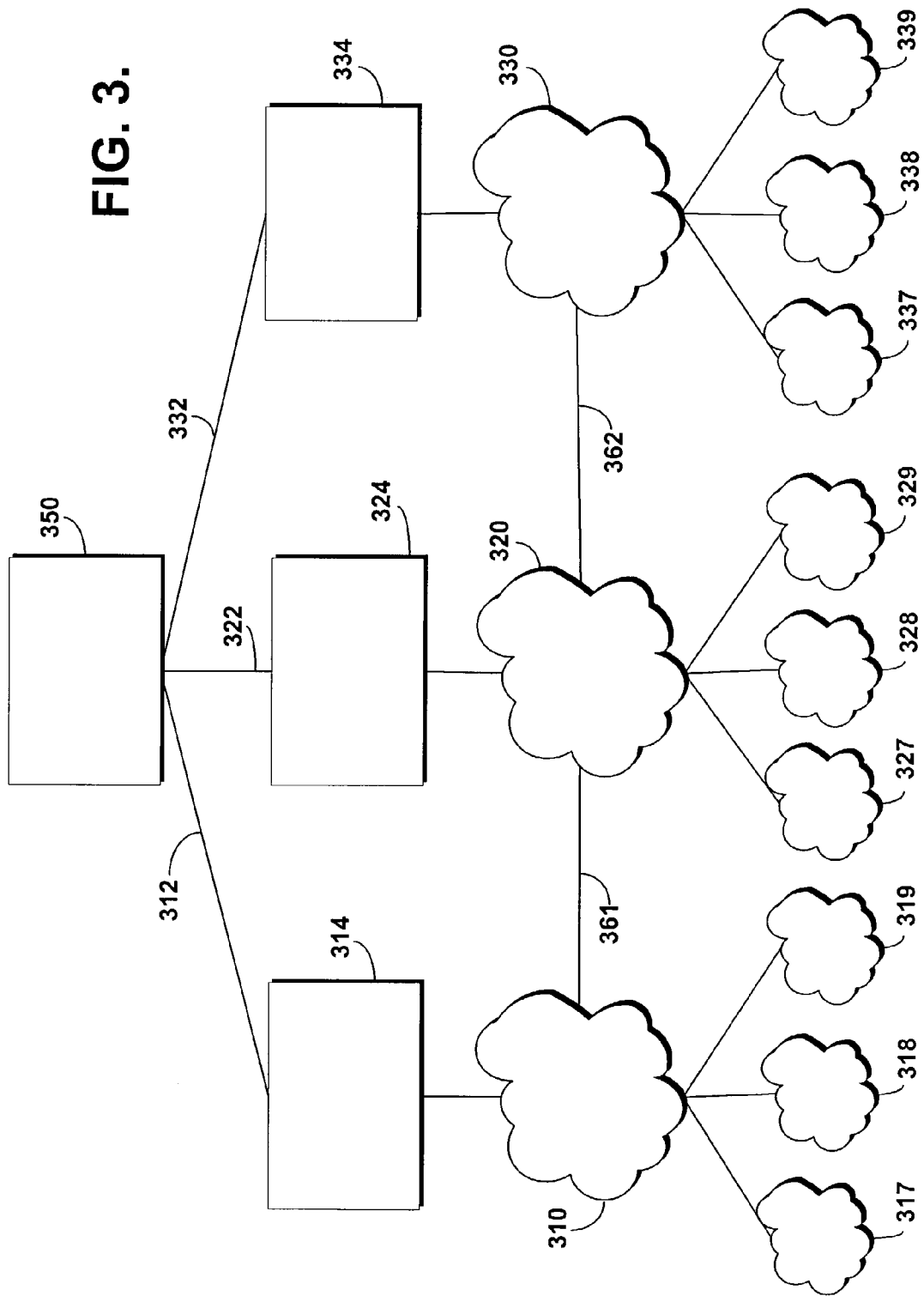
FIG. 3 is a schematic illustration of one possible arrangement of telecommunication networks in a carrier virtual network.

Referring now to FIG. 3, one possible arrangement of telecommunication networks involved in a carrier virtual network in accordance with the present invention is illustrated schematically. For illustrative purposes, FIG. 3 illustrates a carrier virtual network with three participating telecommunication networks: a domestic telecommunication network 310, an international telecommunication network 320, and a third party telecommunication network 330. The characterization of the participating telecommunication networks illustrated in FIG. 3 as "domestic", "international", and "third party" are for illustrative purposes only and are immaterial to the formation of the carrier virtual network. The number and types of telecommunication networks involved in a carrier virtual network may vary from those described in conjunction with and illustrated in FIG. 3.

The carrier virtual network system manager 350 receives, maintains, and provides information regarding which layer one resources are dedicated to the carrier virtual network. The carrier virtual network system manager 350 exchanges information regarding the layer one resources available with the network system managers of the participating telecommunication networks. A first dedicated connection 312 between carrier virtual network system manager 350 and the first network system manager 314 of the domestic network 310 allows for the exchange of information regarding the layer one resources dedicated to the carrier virtual network. The first network system manager 314 may be a system of the type referred to in the art as an OSS or a BSS, as may the other network system managers discussed herein. One or more of the network system managers may also be a carrier virtual network application manager. A second dedicated connection 322 between carrier virtual network system manager 350 and the international network system manager 324 likewise allows for the exchange of information regarding the layer one resources dedicated to the carrier virtual network. A third dedicated connection 332 between the third party network system manager 334 and the carrier virtual network system manager 350 likewise allows for the exchange of information regarding the layer one resources dedicated to the carrier virtual network. The first dedicated connection 312, second dedicated connection 322, and third dedicated connection 332 may be web based connections.

The first network system manager 314 manages domestic network 310. Domestic network 310 may connect to other networks, which may be networks accessed through domestic network 310, such as domestic local network 317, domestic local network 318, and domestic local network 319. A second network system manager 324 may manage international network 320. Other networks may likewise be accessed through international network 320, such as international local network 327, international local network 328, and international local network 329. The third party network 330 may be domestic, international, or any other type of telecommunication network, and may be managed by the third network system manager 344. Other networks may be accessed through third party network 330, such as subnetwork 337, subnetwork, 338, and subnetwork 339.

Dedicated connection 312 allows the first network system manager 314 and carrier virtual network system manager 350 to exchange information regarding the portions of layer one resources dedicated to the carrier virtual network, as well as which portions of international network 320 and third party network 330 have been dedicated to the carrier virtual network. First network system manager 314 can then access layer one resources of international network 320 and third party network 330 dedicated to the carrier virtual network for establishing a connection or provisioning a connection via network connection 361 and network connection 362. The second network system manager 324 and the third party network system manager 334 likewise exchange information with the carrier virtual network system manager 350 regarding the portions of layer one resources dedicated to the carrier virtual networks using the second dedicated connection 322 and the third dedicated connection 332 and use network connection 361 and network connection 362 to access layer one resources of other networks dedicated to the carrier virtual network to provision and establish connections.

Figure 4:
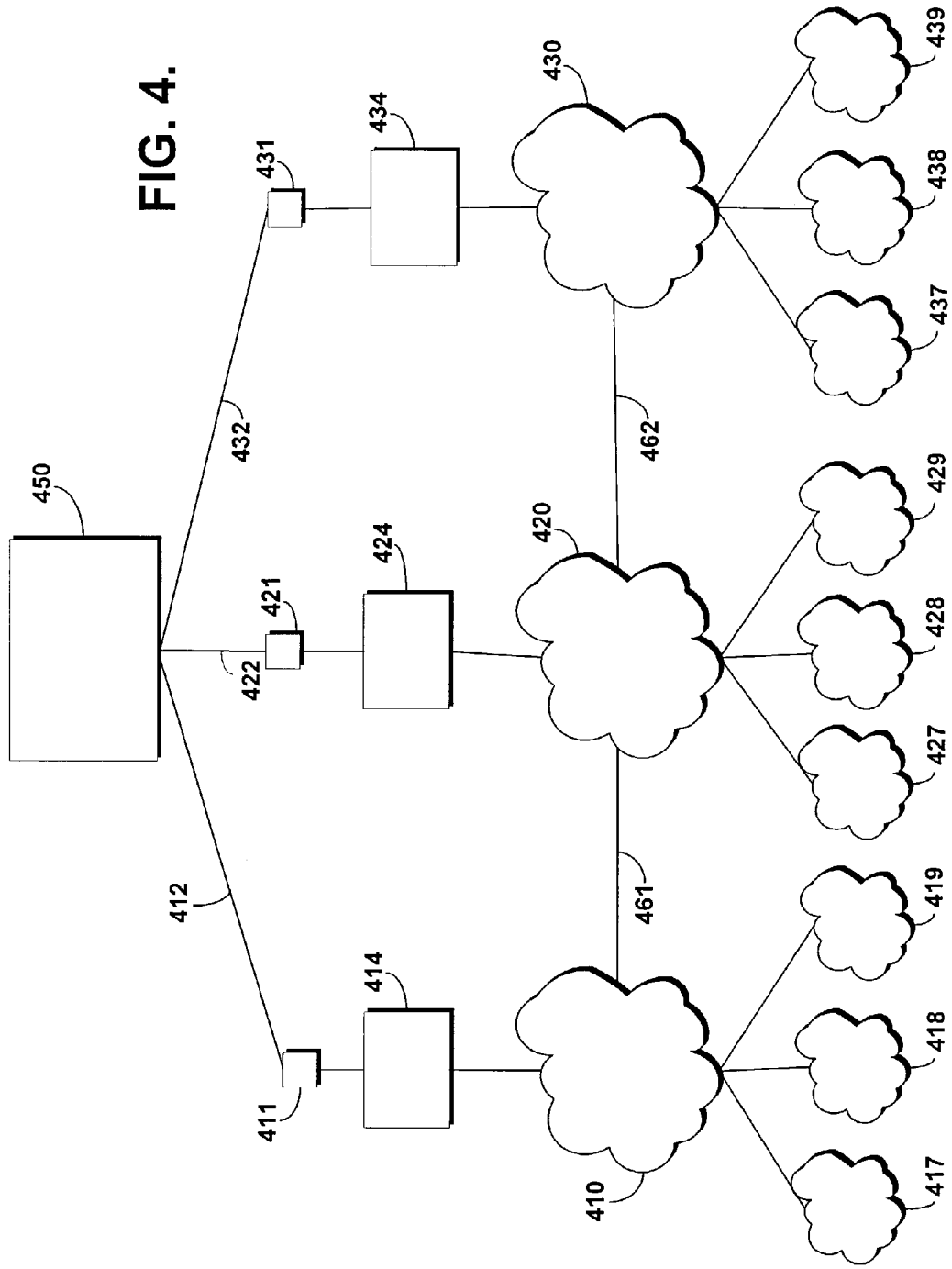
FIG. 4 is a schematic illustration of one possible arrangement of telecommunication networks in a carrier virtual network.

Referring to FIG. 4, another possible arrangement of telecommunication networks participating in a carrier virtual network is illustrated schematically. A domestic network 410 may connect to other networks, which may be networks accessed through the domestic network 410, such as domestic local network 417, domestic local network 418, and domestic local network 419. A first network system manager 414 may manage domestic network 410. A second network system manager 424 manages international network 420. Other networks may be accessed through international network 420, such as international local network 427, international local network 428, and international local network 429. A third network system manager 434 may manage third party network 430. Other networks may be accessed through third party network 430, such as subnetwork 437, subnetwork 438, and subnetwork 439.

As shown in FIG. 4, a first carrier virtual network interface 411 is interposed between carrier virtual network system manager 450 and the first network system manager 414. Dedicated connection 412 allows the first carrier virtual network interface 411 to exchange information regarding the portions of layer one resources dedicated to a carrier virtual network. Likewise, a second carrier virtual network interface 421 is interposed between carrier virtual network system manager 450 and the second network system manger 424, and a third carrier virtual network interface 431 is interposed between the carrier virtual network system manager 450 and the third network system manager 434. The second carrier virtual network interface 421 and the third carrier virtual network interface 431 exchange information with the carrier virtual network system manager 450 regarding the portions of layer one resources dedicated to carrier virtual networks using the second dedicated connection 422 and the third dedicated connection 432. The third carrier virtual network interface 431, second carrier virtual network interface 421, and first carrier virtual network interface 411 provide an interface between the carrier virtual network system manager 450 and the respective network system manager 434, 424, 414 in the exchange of information regarding the layer one resources dedicated to a carrier virtual network.

The interoperability function provided by the interfaces 411, 421, 431 may be outsourced to the third parties as well, thus representing a separate logic element in the high level architecture shown in FIG. 4. The use of carrier virtual network interfaces 411, 421, 431 to provide an interface between the carrier virtual network system manager 450 and network system managers 414, 424, 434 that manage the participating telecommunication networks 410, 420, 430 can be useful for a variety of reasons. Differences in network system managers of different telecommunication networks, such as different protocols and different communication standards, may render direct connections between the carrier virtual network system manager and the network system managers difficult. The use of carrier virtual network interfaces between the carrier virtual network system manager 450 and the various network system managers 414, 424, 434 allows the carrier virtual network system manager 450 to operate in a standardized fashion, with individual carrier virtual network interfaces 411, 421, 431 converting information for exchange between the carrier virtual network system manager 450 and the network system managers 414, 424, 434. In some instances, a network system manager 414, 424, 434 may be able to exchange information directly with the carrier virtual network system manager 450, in which case a carrier virtual network interface 411, 421, 431 may be omitted. The function of the carrier virtual network interface 411, 421, 431 may also be performed by the carrier virtual network system manager 450 or the network system manager 414, 424, 434 of participating telecommunication networks 410, 420, 430.

Figure 5:
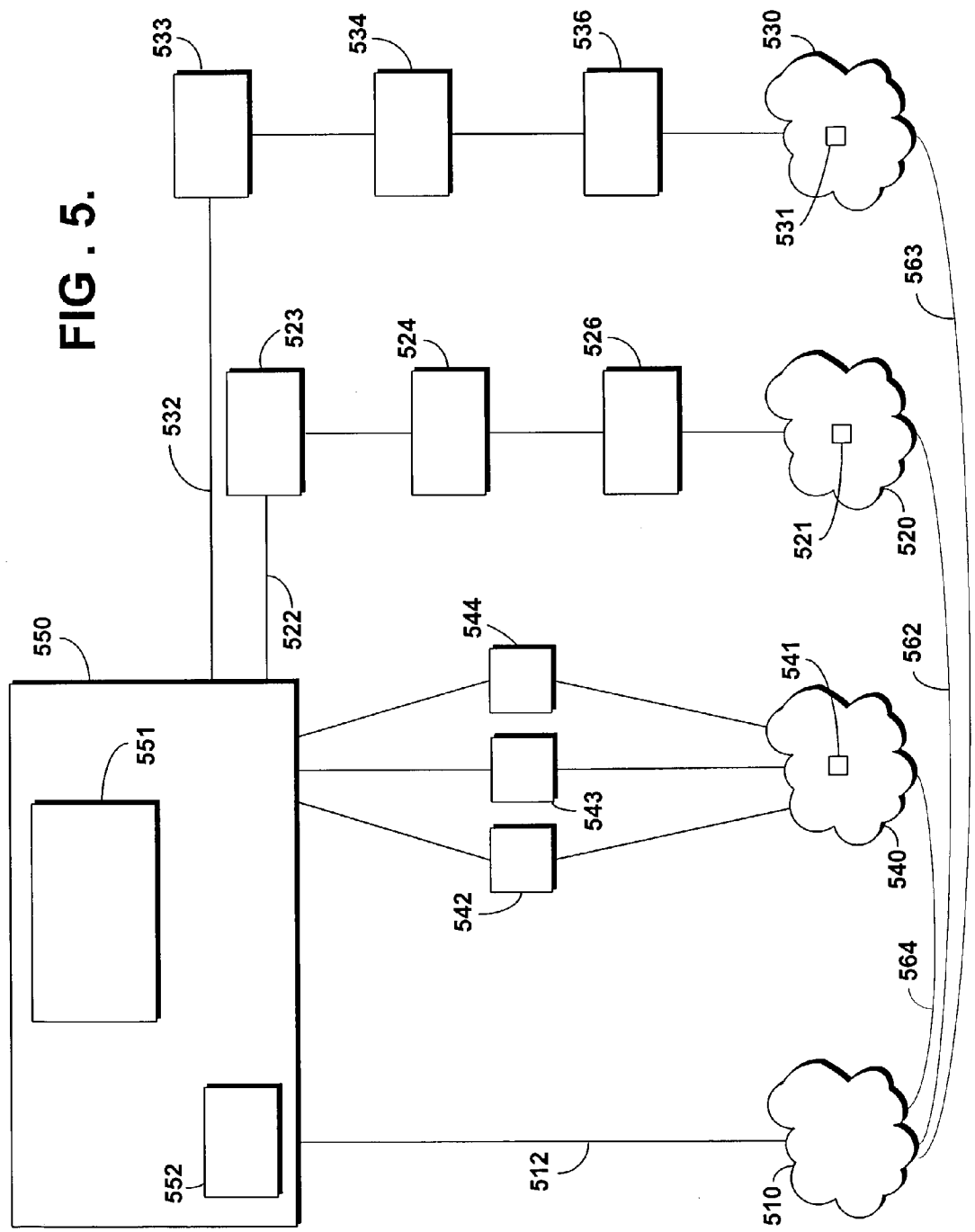
FIG. 5 is a schematic illustration of one possible arrangement of telecommunication networks in a carrier virtual network.

Referring now to FIG. 5, another possible arrangement of telecommunication networks participating in a carrier virtual network in accordance with the present invention is illustrated. The carrier virtual network system manager 550 may include within it the functionality of network system manager 552, thereby eliminating the need for a separate network system manager as illustrated in FIG. 3 and FIG. 4. The network system manager functionality 552 may be of any variety, such as an OSS/BSS, a legacy system manager or a different type of system manager. The carrier virtual network system manager 550 may include any number, including zero, network system manager functionalities of any number and combination of types. Furthermore, some participating telecommunication systems may be managed by network system manager functionality incorporated into the carrier virtual network system manager 550 while other participating telecommunication networks are managed by their own network system managers that exchange information with the carrier virtual network system manager 550.

A first dedicated connection 522 links the carrier virtual network system manager 550 to a first carrier virtual network interface 523. The first carrier virtual network interface 523 connects to a first network system manager 524, which then connects to at least one element manager 526 that controls particular elements of the first network 520, such as layer one resources dedicated to the carrier virtual network, for example element 521. A second dedicated connection 532 connects the carrier virtual network system manager 550 to a second carrier virtual network interface 533. The second carrier virtual network interface 533 connects to a second network system manager 534, which then connects to at least one element manager 536 that controls particular elements of the second network 530, such as layer one resources dedicated to the carrier virtual network, for example element 531. Element 521 and element 531 may be any layer one resource dedicated to the carrier virtual network. The components and their arrangement shown in FIG. 5 are illustrative only. Additional components beyond those shown in FIG. 5 may be used, and components shown in FIG. 5 may be omitted without departing from the scope of the invention.

As illustrated in FIG. 5, a domestic network 510 may access layer one resources dedicated to the carrier virtual network. Domestic network 510 connects to the carrier virtual network system manager 550 through dedicated connection 512 and is managed by the network system manager functionality 552 incorporated in the carrier virtual network system manager 550.

An international network 540 may connect to the carrier virtual network system manager 550 through a first vendor network system manager 542, a second vendor network system manager 543, and a third vendor network system manager 544. Each vendor network system manager may be used to manage equipment in the network 540 produced by that vendor. Accordingly, any number of vendor network managers may be used. The international network 540 may be managed as a whole by system manager functionality 552 of carrier virtual network system manager 550, or separate management systems may be used. A portion of the layer one resources of the international network 540, for example element 541, may be dedicated to the carrier virtual network. Element 541 may be any layer one resource dedicated to the carrier virtual network.

A network connection 564 connects domestic network 510 to international network 540, a network connection 562 connects domestic network 510 to first telecommunication network 520, and a network connection 563 connects domestic network 510 to the second telecommunication network 530. Domestic network 510 may access the portions of layer one resources dedicated to the carrier virtual network such as element 521, element 531, and element 541 using network connection 562, network connection 563, and network connection 564 respectively.

Referring now to FIG. 6, an example of the dedication of a layer one telecommunication resource to a carrier virtual network is illustrated. The layer one resource 600 may be any layer one resource used to provide telecommunication services, such as a high bandwidth optical fiber or other resource used in the transmission, optical, switching, and connection of telecommunication signals. As illustrated in FIG. 6, a single layer one resource may sometimes be dedicated to more than one carrier virtual network. A first portion 610 of the resource 600 may be reserved for a first use. For example, first portion 610 of resource 600 may be retained for the use of the telecommunication service provider that owns resource 600, meaning that first portion 610 will not be available to a carrier virtual network. A second portion 620 may be dedicated to a first carrier virtual network. A third portion 630 may be dedicated to a second carrier virtual network, while a fourth portion 640 may be dedicated to a third carrier virtual network. The number of portions that a layer one resource 600 is divided into is immaterial to the present invention. A layer one resource 600 may be dedicated in its entirety to a single carrier virtual network, it may be split in any technically feasible proportion between the owner of the resource 600 and a carrier virtual network, it may be split among multiple carrier virtual networks, or it may be split between carrier virtual networks and other uses. Some layer one resources may be capable of any number of divisions, while other layer one resources, such as a digital access cross-connect system ("DACS") with a finite, integral number of available ports, may be divisible only within certain parameters.

Referring now to FIG. 7, the allocation of ports of a particular resource, in this case a DACS 700, is illustrated. The DACS 700 includes a finite integral number of ports, such as port 750. A first portion 701 of the DACS 700 is dedicated to a first carrier virtual network. A second portion 702 of the DACS 700 is dedicated to a second carrier virtual network, and third portion 703 of the DACS 700 is dedicated to a third carrier virtual network. The telecommunication networks with access to the carrier virtual networks to which portions of the DACS 700 are dedicated may receive information regarding the DACS 700 in a variety of ways, such as the use of dedicated connections and a carrier virtual network system manager as described above. To the first carrier virtual network the DACS 700 appears to be a single DACS 710 with the ports 715 available to the first carrier virtual network. To the second carrier virtual network the DACS 700 appears to be a DACS 720 with the ports 725 allocated to the second carrier virtual network. To the third carrier virtual network the DACS 700 appears to be a DACS 730 with only the port 735 allocated to it. In each case, the ports allocated to a given carrier virtual network would appear as resources available to users of that carrier virtual network. As discussed above, this facilitates the provisioning of customer requests and the establishment of customer requested services. While FIG. 7 illustrates specific ports being allocated to the carrier virtual networks, it should be appreciated that in actual practice the ports allocated to a carrier virtual network may not be contiguous and, in fact, may not be constant, instead referring to a particular number of ports on a particular device that are dedicated to a carrier virtual network, not particular and individual ports within that device that are dedicated to a carrier virtual network.

Figure 8:
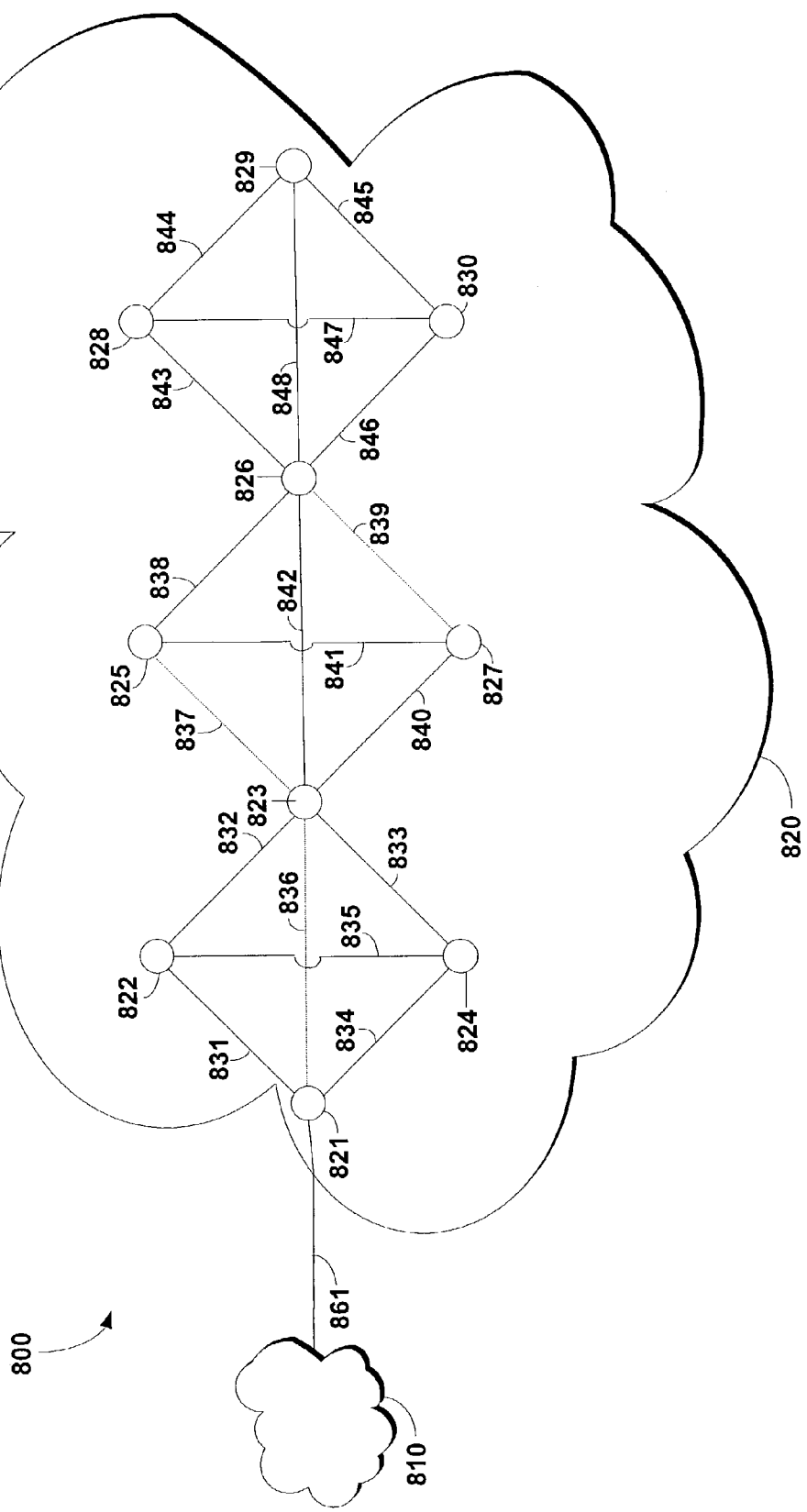
FIG. 8 is a schematic illustration of the dedication of portions of layer one resources of a telecommunication network to a carrier virtual network.

Referring now to FIG. 8, the allocation of layer one resources to a carrier virtual network 800 is illustrated. A first network 810 and a second network 820 are linked by network connection 861. While not illustrated in FIG. 8, suitable means to exchange information regarding the portions of layer one resources dedicated to a carrier virtual network, such as a carrier virtual network system manager and dedicated connections, may be used to identify the layer one resources of the second network 820 dedicated to the carrier virtual network to the first telecommunication network 810. Layer one telecommunication resources of the second network 820 may be dedicated in varying proportions to the carrier virtual network. For example, connection 831, connection 832, connection 833, connection 840, and connection 845 may be dedicated to the carrier virtual network at a first level of access. Ports on nodes, including ports on node 822, node 823, and node 830 may likewise be dedicated to the carrier virtual network at a first level of access. The first level of access may be, for example, a minimum available bandwidth. Other layer one resources may be dedicated to the carrier virtual network at a second level of access, for example connection 835, connection 838, connection 842, connection 843, connection 844, as well as ports on node 824, node 826, and node 828. The second level of access may be, for example, a second minimum available bandwidth. Additional layer one resources may be dedicated to the carrier virtual network at a third level of access, for example connection 834, connection 841, connection 846, connection 848, as well as ports on node 821, node 825, node 827, and node 829. The third level of access may be, for example, a third minimum available bandwidth. Not all layer one resources of the second network 820 need be dedicated to the carrier virtual network. Examples of layer one resources not dedicated to the carrier virtual network, may be, for example connection 836, connection 837, connection 839 and connection 847. Layer one resources of the second network 820 that are not dedicated to the carrier virtual network are not accessible to the first network 810 through the carrier virtual network for purposes such as establishing a connection for a customer or provisioning a customer request. Layer one resources of the second network 820 that are dedicated to the carrier virtual network are accessible to the first telecommunication network 810 for purposes such as establishing a customer connection and provisioning a customer request. It should be further noted that layer one resources within the first network 810 may be likewise dedicated to a carrier virtual network that may be accessed by the second network 820, although that is not illustrated in FIG. 8.

Figure 9:
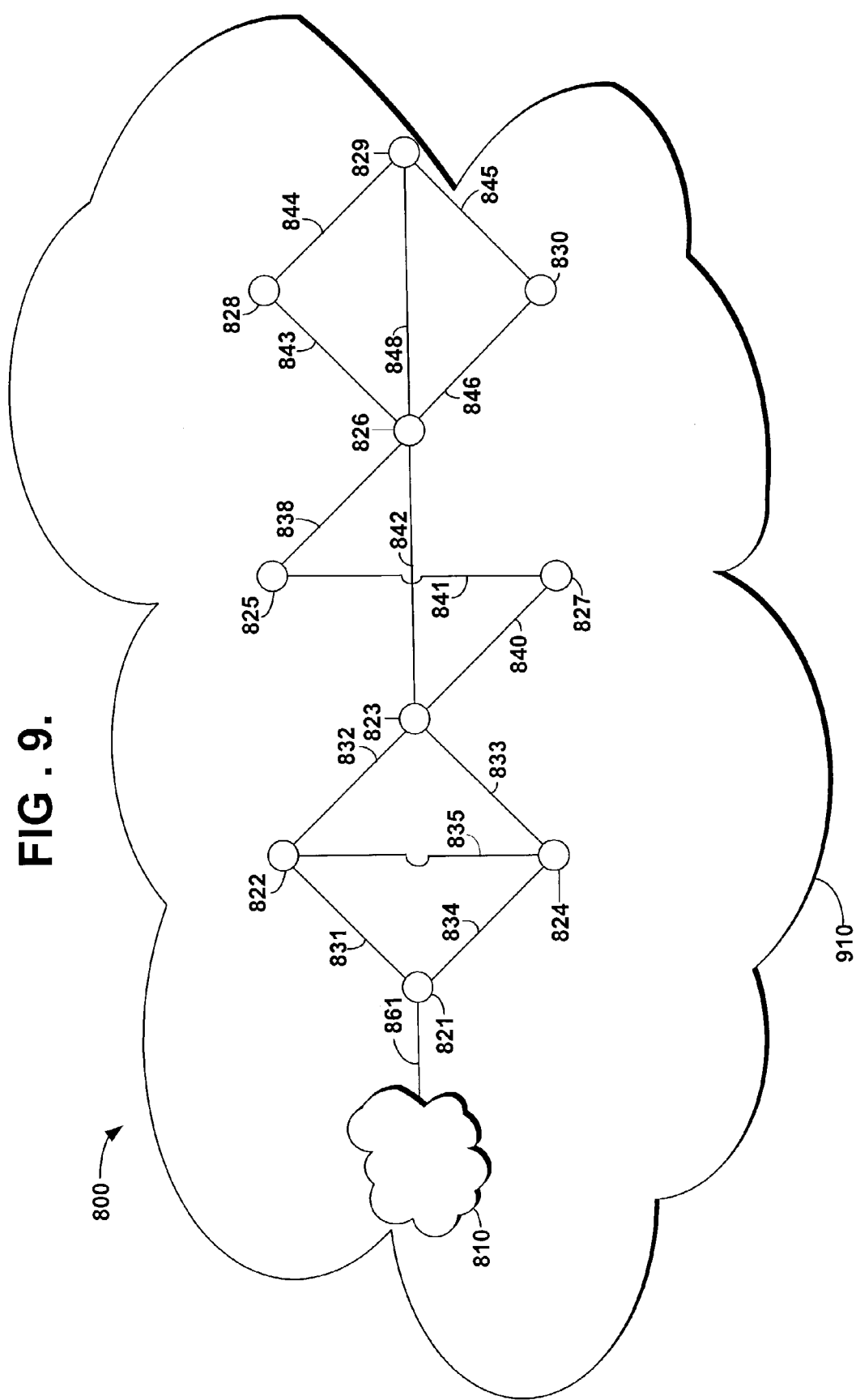
FIG. 9 is a schematic illustration of the apparent network available to a user of telecommunication network by accessing layer one resources dedicated to a carrier virtual network.

Referring now to FIG. 9, the apparent network available to a user of the first telecommunication network 810 incorporating the layer one resources dedicated to the carrier virtual network from the second network 820 is illustrated. To a customer accessing the first network 810, the network capabilities available now extend to the extent of the apparent network 910, which includes the first network 810 and the portion of layer resources allocated to the carrier virtual network from the second network 820 to the level of access each resource is dedicated to the carrier virtual network.

Figure 10:
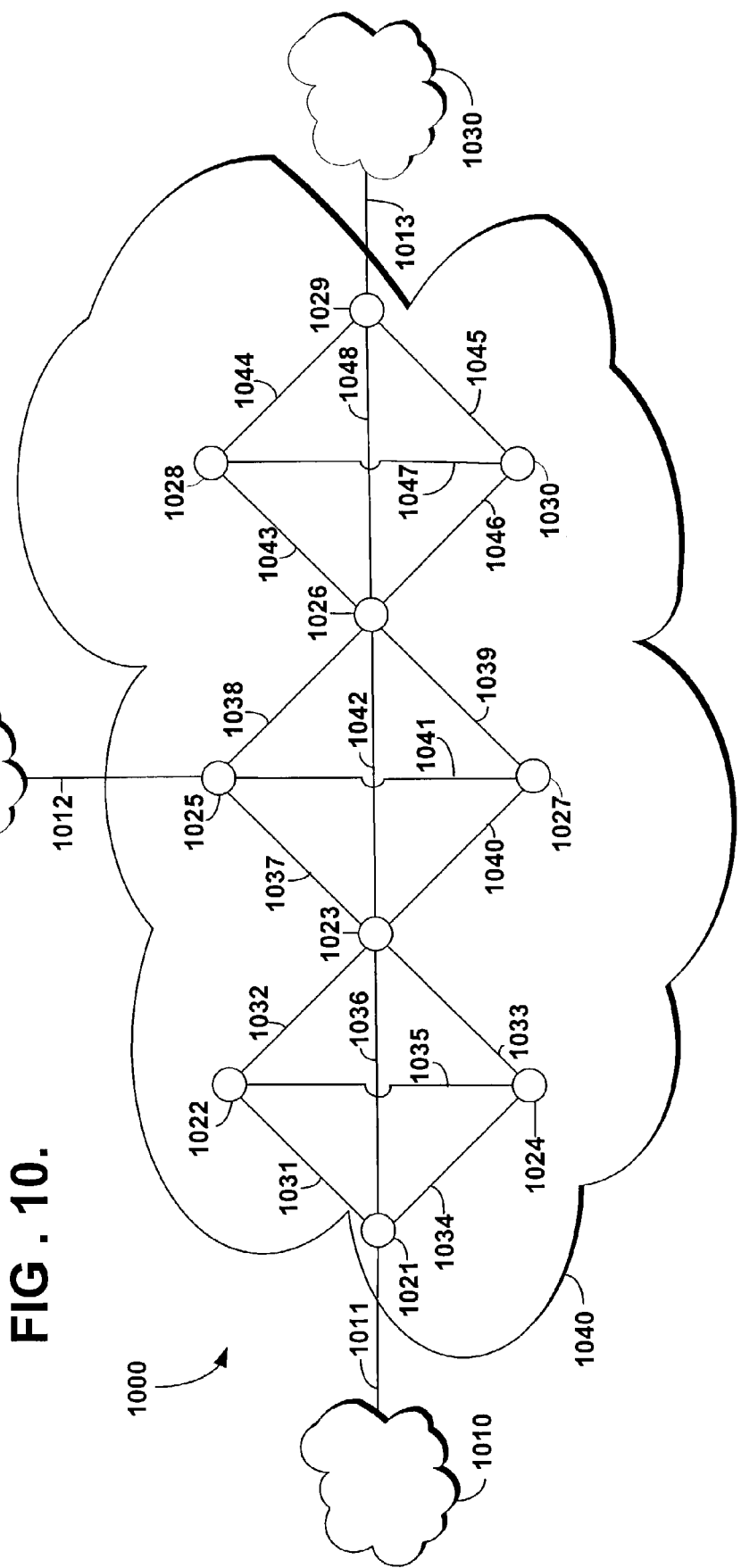
FIG. 10 is a schematic illustration of four telecommunication networks participating in three carrier virtual networks.

Referring now to FIG. 10, four telecommunication networks participating in three carrier virtual networks are illustrated. A first network 1010, a second network 1020, and a third network 1030 each has access to portions of the layer one resources of a fourth telecommunication network 1040 in carrier virtual network arrangement. It should be understood that the first network 1010, the second network 1020, and the third network 1030 may dedicate portions of their layer one resources to one or more carrier virtual networks as well, although that is not illustrated in FIG. 10.

Within the fourth network 1040 a first portion of layer one resources may be dedicated to a first carrier virtual network accessible by the first telecommunication network 1010. The first portion may comprise ports on node 1021, node 1023, node 1025, node 1027 as well as connection 1036, connection 1037, and connection 1040. The first telecommunication network 1010 may access the first portion of layer one resources dedicated to the first carrier virtual network using network connection 1011.

Within the fourth network 1040 a second portion of layer one resources may be dedicated to a second carrier virtual network accessible by the second telecommunication network 1020. The second portion may comprise ports on node 1023, node 1024, node 1025, node 1026, node 1027, node 1029 as well as connection 1033, connection 1038, connection 1040, connection 1041, and connection 1048. The second telecommunication network 1020 may access the second portion of layer one resources dedicated to the second carrier virtual network using network connection 1012.

Within the fourth network 1040 a third portion of layer one resources may be dedicated to a third carrier virtual network accessible by the third telecommunication network 1030. The third portion may comprise ports on node 1021, node 1022, node 1023, node 1024, node 1026, node 1027, node 1028, node 1029, node 1030 as well as connection 1031, connection 1032, connection 1035, connection 1039, connection 1040, connection 1044, connection 1045, and connection 1046. The third telecommunication network 1030 may access the third portion of layer one resources dedicated to the third carrier virtual network using network connection 1013.

Figure 11:
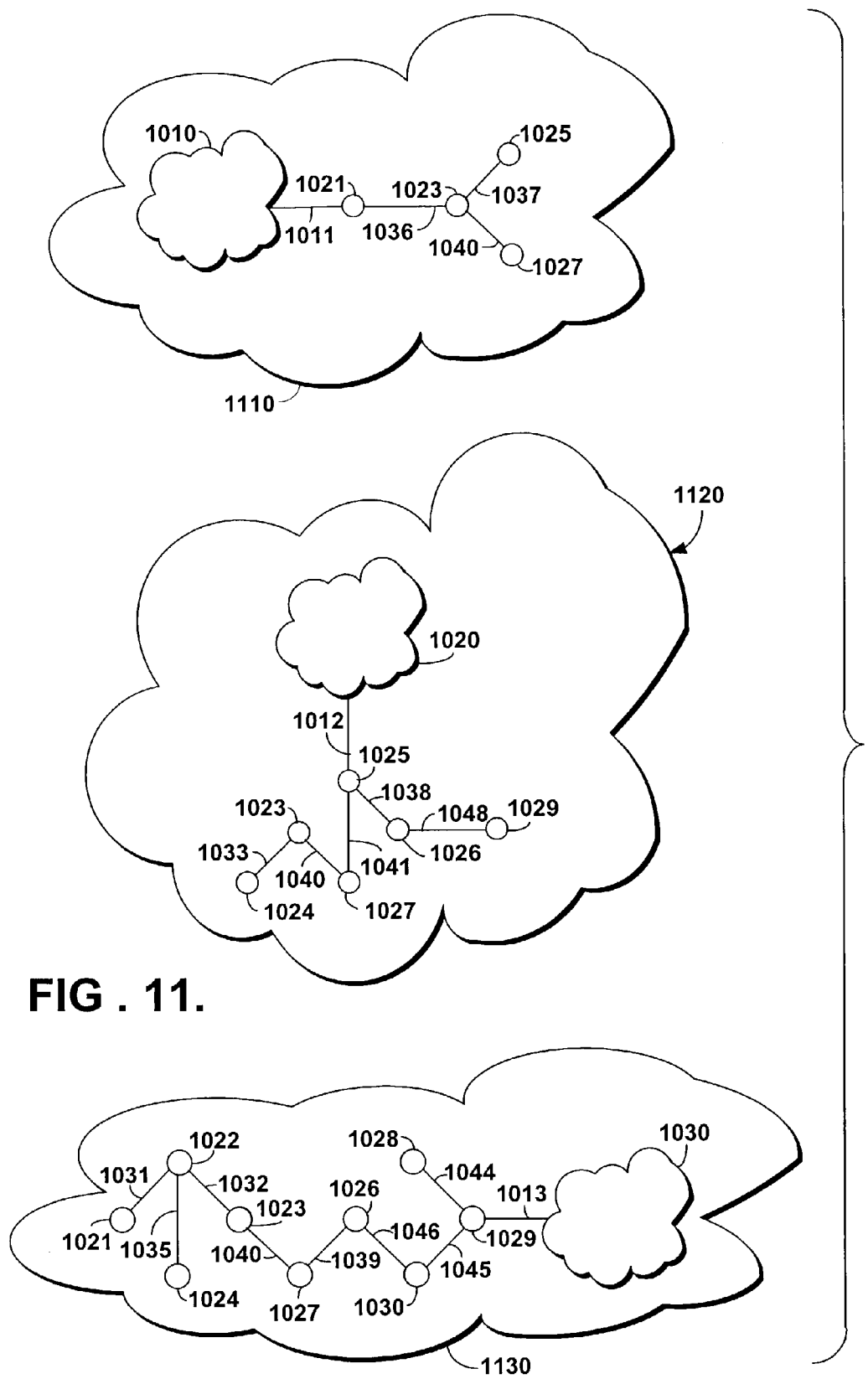
FIG. 11 is a schematic illustration of the apparent networks available to users of telecommunication networks by accessing layer one resources dedicated to carrier virtual networks.

Referring now to FIG. 11, the resulting apparent networks from the dedication of resources from the fourth network 1040 to the carrier virtual networks as illustrated in FIG. 10 are shown in greater detail. The first apparent network 1110 extends to both the first network 1010 and the first portion of layer one resources from the fourth network 1040 dedicated to the first carrier virtual network. The second apparent network 1120 extends to both the second network 1020 and the second portion of layer one resources of the fourth network 1040 dedicated to the second carrier virtual network. The third apparent network 1130 extends to both the third network 1030 and the third portion of layer one resources of the fourth network 1040 dedicated to the third carrier virtual network.

Figure 12:
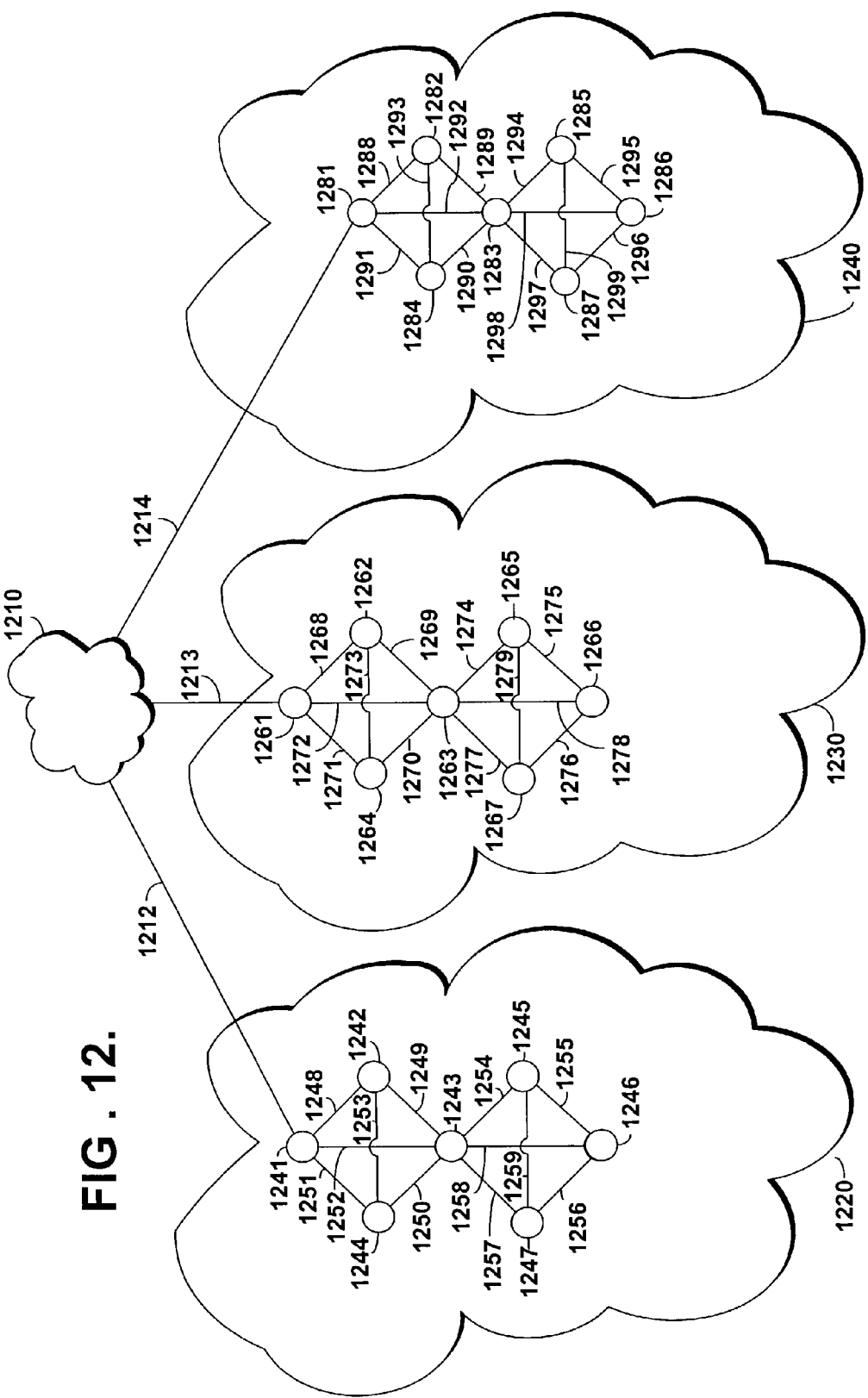
FIG. 12 is a schematic illustration of four telecommunication networks participating in a multiparty carrier virtual network.

Referring now to FIG. 12, four telecommunication networks participating in one carrier virtual network accessible to a single telecommunication network is illustrated. A first telecommunication network 1210 is connected to a second telecommunication network 1220 by network connection 1212, a third telecommunication network 1230 by network connection 1213, and a fourth telecommunication network 1240 by network connection 1214. The second network 1220, the third network 1230, and the fourth network 1240 each dedicates a portion of layer one resources to the carrier virtual network accessible by the first network. The second telecommunication network 1220 may dedicate a first portion of layer one resources comprising, for example, ports on node 1241, node 1242, node 1243, node 1244, node 1246, node 1247 as well as connection 1248, connection 1249, connection 1253, connection 1256, and connection 1257 to the carrier virtual network. The first telecommunication network may access the first portion of layer one resources dedicated to the carrier virtual network from the second telecommunication network using network connection 1212. The third telecommunication network may dedicate a second portion of layer one resources comprising, for example, ports on node 1261, node 1262, node 1263, node 1264, node 1265, node 1266, node 1267 as well as connection 1268, connection 1269, connection 1271, connection 1273, connection 1274, connection 1276, and connection 1279 to the carrier virtual network. The first telecommunication network may access the second portion of layer one resources dedicated to the carrier virtual network from the third telecommunication network using network connection 1213. The fourth telecommunication network 1240 may dedicate a third portion of layer one resources comprising, for example, ports on node 1281, node 1283, node 1284, node 1285, node 1286, node 1287 as well as connection 1290, connection 1291, connection 1294, connection 1295, connection 1296, and connection 1299 to the carrier virtual network. The first telecommunication network may access the third portion of layer one resources dedicated to the carrier virtual network from the fourth telecommunication network 1240 using network connection 1214. The portions of layer one resources dedicated to the carrier virtual network by the second telecommunication network 1220, the third telecommunication network 1230 and the fourth telecommunication network 1240 are available to the first telecommunication network 1210 as if they were part of the first telecommunication network 1210.

Figure 13:
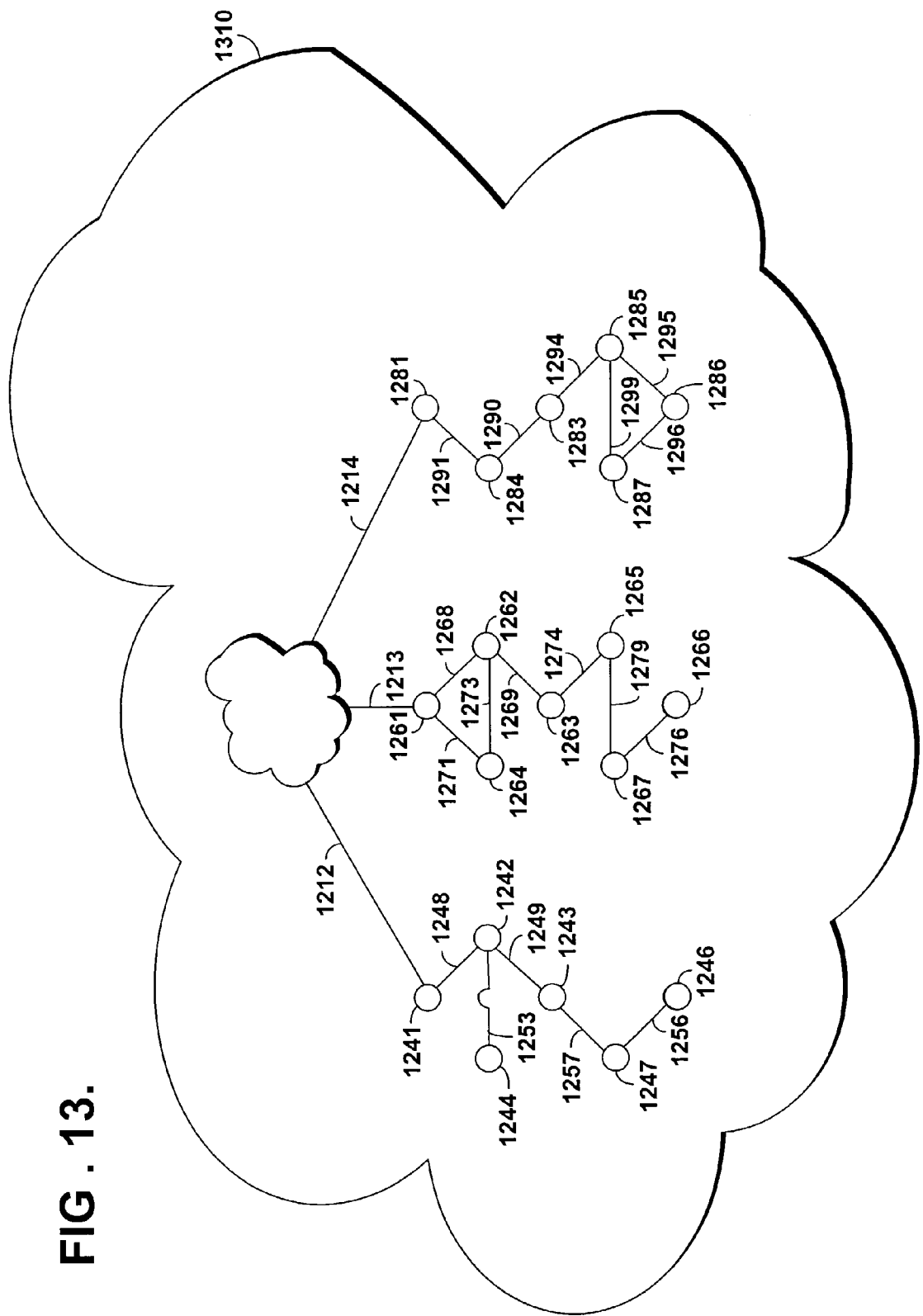
FIG. 13 is a schematic illustration of the apparent network available to a user of a telecommunication network by accessing layer one resources dedicated to a carrier virtual network.

FIG. 13 illustrates the apparent first telecommunication network 1310 available to a user of the first telecommunication network 1210 as a result of the dedication of layer one resources to the carrier virtual network. The resources available to the apparent first telecommunication network 1310 extends to the first telecommunication network 1210, the first portion of layer one resources dedicated to the carrier virtual network from the second telecommunication network 1210, the second portion of layer one resources dedicated to the carrier virtual network from the third telecommunication network 1230, and the third portion of layer one resources dedicated to the carrier virtual network from the fourth telecommunication network 1240.

It should be appreciated that in FIGS. 8-13 the means for exchanging information regarding the layer one resources dedicated to a carrier virtual network are not shown. The means for exchanging information may utilize a carrier virtual network system manager, possibly in combination with one or more carrier virtual network interfaces. If used, the carrier virtual network system manager may exchange information with the network system managers of participating telecommunication networks. If used, the carrier virtual network system manager may perform the function of a network system manager for some or all of the participating telecommunication networks. If no carrier virtual network system manager is used, the network system managers of participating telecommunication networks may directly exchange information using dedicated connections, network connections, or other means.

Figure 14:
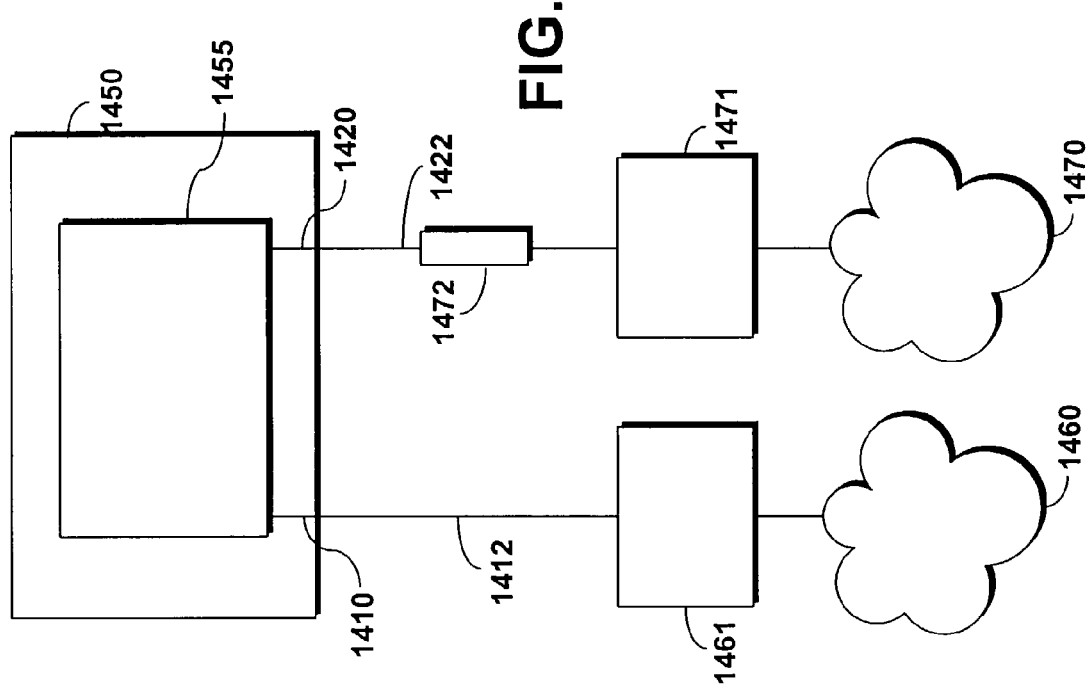
FIG. 14 is a schematic illustration of one embodiment of a carrier virtual network system manager and two participating telecommunication networks.

Referring now to FIG. 14, one possible embodiment of a carrier virtual network system manager 1450 is illustrated. The carrier virtual network system manager 1450 includes a means 1455 for maintaining information regarding layer one resources dedicated to a carrier virtual network. Means 1455 may comprise a suitable data base, electronic records, or other suitable means for maintaining and, optionally, updating information regarding the identity of portions of layer one resources dedicated to a carrier virtual network. Means 1455 may also retain information regarding participating telecommunication networks, particularly as to which participating telecommunication networks may access which carrier virtual networks maintained by the carrier virtual network system manager 1450. Means 1455 may be any type of computer readable or machine readable media with instructions to perform the method illustrated and described herein. One suitable use of machine readable media is the use of Java programming language in conjunction with a Unix or Linux server to create appropriate computer software.

The carrier virtual network system manager 1450 may further contain a first interface means 1410 for interfacing with a first telecommunication network 1460. As illustrated in FIG. 14, first interface means 1410 connects to a dedicated connection 1412, which connects the first telecommunication network 1460 and its first network system manager 1461 to the first interface means 1410 of the carrier virtual network system manager 1450. First interface means 1410 allows means 1455 to exchange information with the system manager 1461.

The carrier virtual network system manager 1450 may further contain a second interface means 1420. As illustrated in FIG. 14, the second interface means 1420 connects to a dedicated connection 1422 that connects the carrier virtual network system manager 1450 to a second network 1470. Dedicated connection 1422 connects the second interface means 1420 to a carrier virtual network interface 1472, which then connects to the second telecommunication system network manager 1471. Second interface means 1420 allows means 1455 to exchange information with the carrier virtual network interface 1472 and the system manager 1471. It should be noted that the carrier virtual network interface 1472, which is described in more detail above, may be omitted.

In further reference to FIG. 14, it should be appreciated that further interface means may be included in the carrier virtual network system manager 1450 to establish connections with additional participating telecommunication networks. For the sake of simplicity of illustration, only two participating telecommunication networks, a first telecommunication network 1460 and a second telecommunication network 1470, are illustrated in FIG. 14.

Figure 15:
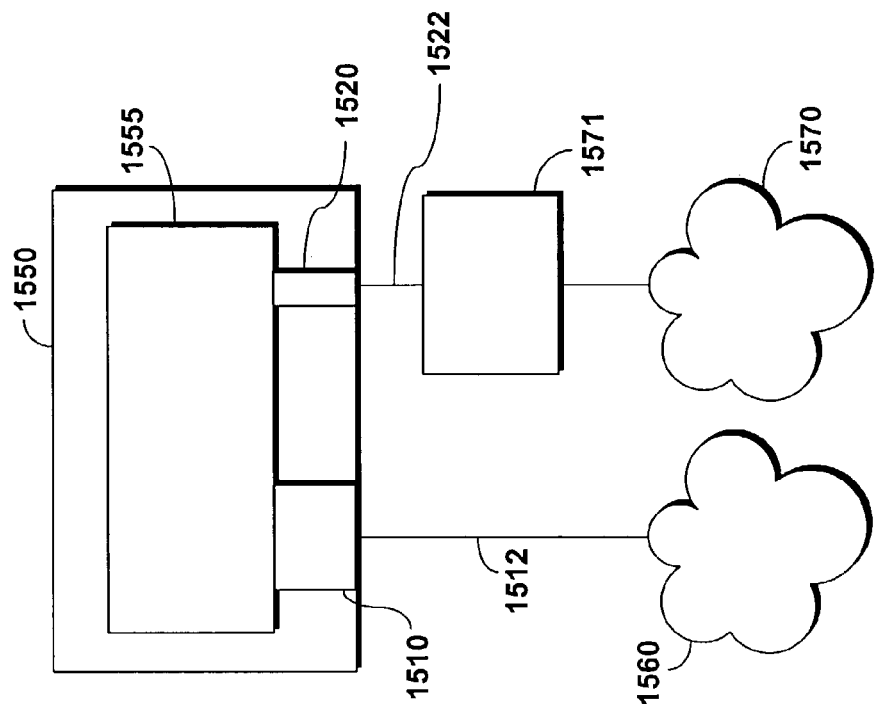
FIG. 15 is a schematic illustration of one embodiment of a carrier virtual network system manager and two participating telecommunication networks.

Referring now to FIG. 15, one alternative embodiment of a carrier virtual network system manager 1550 is illustrated. A carrier virtual network system manager 1550 may contain a means 1555 for maintaining information regarding the layer one resource dedicated to a carrier virtual network, and operates as described above with regard to means 1455. As illustrated in FIG. 15, the carrier virtual network system manager 1550 further comprises within it system manager functionality 1510 that manages the dedicated resources of first telecommunication network 1560 through connection 1512. The carrier virtual network system manager 1550 further includes within it a carrier virtual network interface 1520 that connects to the network system manager 1571 of a second telecommunication network 1570 via dedicated connection 1522. As with FIG. 14, it should be appreciated that additional connections to participating telecommunication networks may be made beyond those illustrated in FIG. 15.

In considering both FIG. 14 and FIG. 15, it should be appreciated that numerous variations can be made to a carrier virtual network system manager in accordance with the present invention beyond that illustrated. Functional capabilities such as system management and carrier virtual network interface functions may be optionally contained within the carrier virtual network system manager, or the carrier virtual network system manager may connect to external functional elements, or a combination thereof.

Referring now to FIG. 16, the flow of data into and out of a carrier virtual network system manager 1650 is illustrated. Information 1610 enters into the carrier virtual network system manager 1650 regarding the identity of layer one resource dedicated to carrier virtual network. Information 1610 will originate from participating telecommunication networks that are dedicating layer one resources to a carrier virtual network. Information 1610 may originate, more specifically, from the network system managers of participating networks that are dedicating layer one resources to a carrier virtual network. If the carrier virtual network system manager 1650 is performing network system management functions for a telecommunication network, the information 1610 may be generated internal to the carrier virtual network system manager 1650. Not all telecommunication networks participating in a carrier virtual network may provide information 1610, as a telecommunication network that is accessing a carrier virtual network only, not dedicating layer one telecommunication resources to a carrier virtual network, will not provide information 1610.

Information 1620 is outputted from the carrier virtual network system manager 1650. Information 1620 serves to identify the layer one telecommunication resources dedicated to a given carrier virtual network. Information 1620 may be outputted to the telecommunication networks that may access a given carrier virtual network. While information 1620 could be outputted to all participating telecommunication networks, information 1620 may be appropriately transmitted only to participating telecommunication networks that may access a given carrier virtual network. In this fashion, each participating telecommunication network that may access a carrier virtual network will receive information 1620 only regarding those layer one telecommunication resources that are dedicated to a carrier virtual network that that particular participating telecommunication network may access. Information regarding layer one telecommunication resource dedicated to a carrier virtual network that may not be accessed by a particular participating telecommunication network need not be included in information 1620 outputted to that telecommunication network. If the network system manager function for a particular participating telecommunication network is being performed by the carrier virtual network system manager 1650 the process of outputting information 1620 would involve providing the information 1620 to that functional aspect of the carrier virtual network system manager 1650.

In further reference to FIG. 16, it should be appreciated that a single carrier virtual network system manager 1650 may be used to establish and maintain any number of carrier virtual networks involving any number of participating telecommunication networks. In such a scenario, not all telecommunication networks participating in a carrier virtual network need participate in all carrier virtual networks. The carrier virtual network system manager 1650 may maintain an appropriate record of which telecommunication networks are participating in which carrier virtual network, which may comprise whether a given telecommunication network has dedicated resources to a given carrier virtual network and whether a given telecommunication network may access a given carrier virtual network. If a participating telecommunication network dedicates layer one resource to a carrier virtual network it will input information 1610 to the carrier virtual network system manager 1650. If a participating telecommunication network may access a carrier virtual network, it will receive information 1620 from the carrier virtual network system manager 1650. If a participating telecommunication network both dedicates layer one resources to a carrier virtual network and may access a carrier virtual network, that participating telecommunication network will both input information 1610 and receive information 1620 with the carrier virtual network system manager 1650.

The information 1610, 1620, exchanged using the carrier virtual network system manager 1650 should be sufficient to identify the layer one resources dedicated to a carrier virtual network and may, optionally, include information regarding which carrier virtual network each layer one resource is dedicated to and the level of access for each resource. Communication protocols and standards to identify layer one resources have been developed and are employed by various telecommunication network system managers. A currently accepted standard may be used, or a specialized standard may be developed and implemented for the carrier virtual network system manager 1650. It should be recalled that carrier virtual network interfaces may be used to convert between standards used by various telecommunication network system managers and the standard employed by the carrier virtual network system manager 1650. It should be further recalled that the carrier virtual network interface may be included within the carrier virtual network system manager 1650 or may be external to it. The use of a carrier virtual network system manager 1650 and appropriate carrier virtual network interfaces facilitates the establishment of a carrier virtual network by overcoming difficulties in identifying layer one resources dedicated to a carrier virtual network that may arise due to differing protocols and standards used in various system managers.

Referring now to FIG. 17, a method 1700 for establishing a carrier virtual network is illustrated. In step 1710 a portion of layer one resources are dedicated to a carrier virtual network. Step 1710 may be repeated any number of times to dedicate multiple portions of layer one resources to a single carrier virtual network, to dedicate multiple portions of layer one resources to multiple carrier virtual networks, or both. In step 1720 information is exchanged regarding a portion of layer one resources dedicated to carrier virtual networks. The exchange of information in step 1720 may utilize a carrier virtual network system manger, or may occur directly between the network system managers of participating telecommunication networks. In step 1730 the portion layer one resources dedicated to a carrier virtual network are accessed. The step 1730 of accessing layer one resources dedicated to a carrier virtual network may utilize a network connection between participating telecommunication networks.

Figure 18:
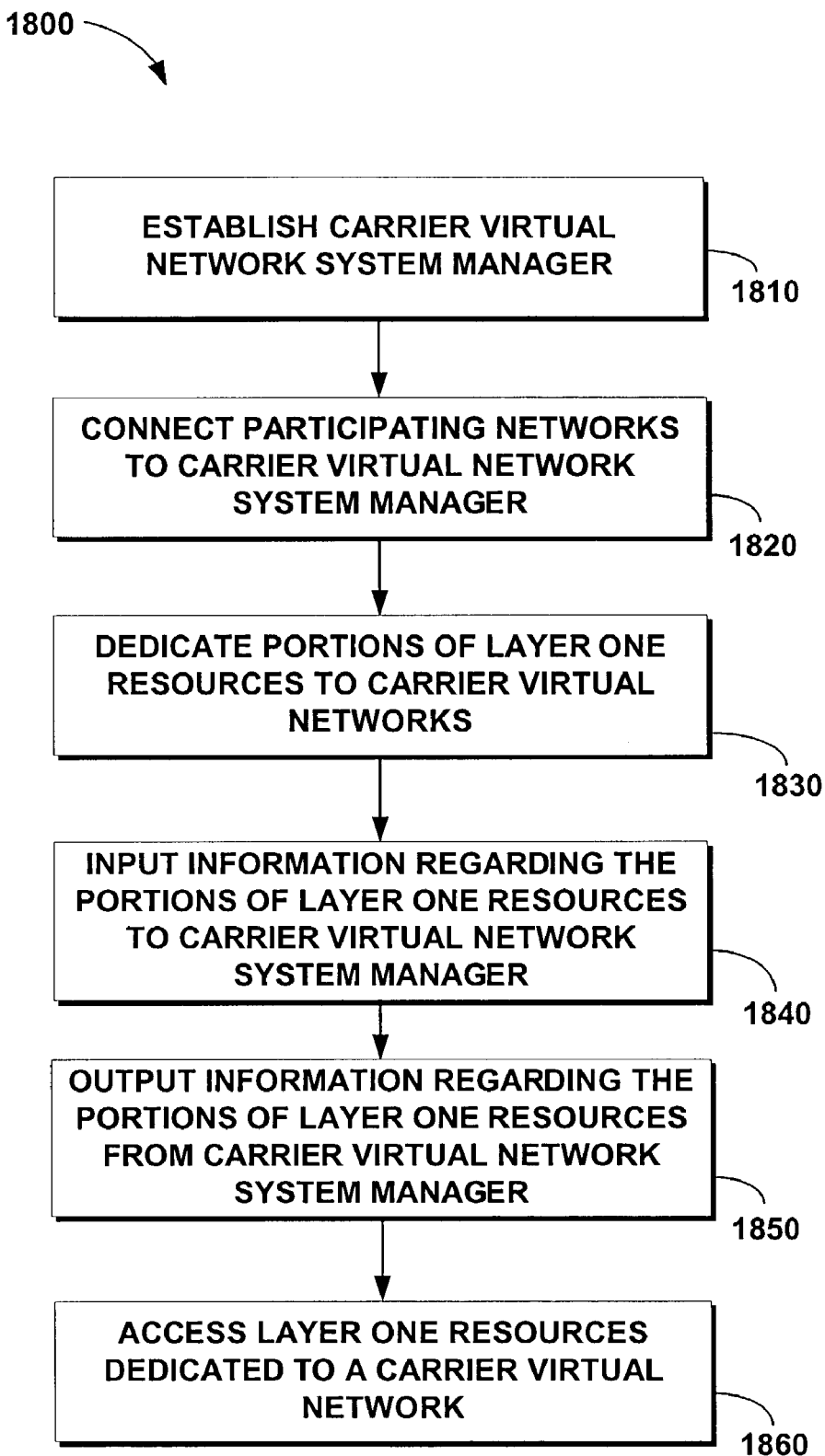
FIG. 18 is a flow diagram of one method for forming a carrier virtual network.

Referring now to FIG. 18, an example of another method 1800 of establishing a carrier virtual network is illustrated. In step 1810 a carrier virtual network system manager, some embodiments of which are described more fully above, is established. In step 1820 the participating telecommunication networks are connected to the carrier virtual network system manager. The way in which participating telecommunication networks are connected to the carrier virtual network system manager may vary. Acceptable connections may be, for example, web based connections, dedicated connections, wireless connections, and some combination of these. In step 1830, portions of the layer one resources of participating telecommunication networks are dedicated to carrier virtual networks. In step 1840, information regarding the portions of layer one resources dedicated to carrier virtual networks is input into the carrier virtual network system manager. In step 1850, information regarding the layer one resources dedicated to carrier virtual network is output from the carrier virtual network system manager. It should be recalled that while step 1850 may involve the carrier virtual network system manager providing information to all participating telecommunication networks, it may also appropriately involve the carrier virtual network system manager providing information identifying the portions of layer one resources dedicated to a carrier virtual network only to those participating telecommunication networks that may access the carrier virtual networks. In step 1860 the portions of layer one resources dedicated to a carrier virtual network are accessed by telecommunication networks that may access the given carrier virtual network. It should be recalled that a network connection may be used to perform step 1860.

It should be appreciated that the above sets forth illustrative examples of carrier virtual networks, carrier virtual network system managers, and methods of establishing a carrier virtual network, but that the invention is not limited to any of the specific embodiments described above. The present invention is not limited to any particular type of layer one telecommunication resource, nor is it limited to any given network system manager protocol or type. Many aspects of the present invention may be implemented using computer software embodied on computer readable media to be executed by a computer or other machine. The use of such computer software may be particularly useful as part of a carrier virtual network system manager. The present invention is not limited to the use of any particular programming language, nor is it limited to the use of any particular computer or other machine to execute the machine readable code. These and other variations will be apparent to one of ordinary skill in the art.

What is claimed is:

1. A carrier virtual network system, the carrier virtual network system comprising:
   a first telecommunication network, the first telecommunication network having a plurality of layer one resources and a first network system manager that manages the first telecommunication network;
   a second telecommunication network, the second telecommunication network having a plurality of layer one resources and a second network system manager that manages the second telecommunication network;
   a first portion of the layer one resources of the second telecommunication network dedicated to a first carrier virtual network, wherein the dedicated layer one resources of the second telecommunication network are freely accessible to the first telecommunications network;
   a first dedicated connection between the first network system manager and the second network system manager, wherein the second network system manager identifies the first portion of layer one resources of the second telecommunication network dedicated to the first carrier virtual network to the first network system manager using the first dedicated connection; and
   a first network connection linking the first telecommunication network to the portion of the first layer one resources of the second telecommunication network dedicated to the first carrier virtual network, the first telecommunication network accessing the first portion of layer one resources of the second telecommunication network through the first network connection.

2. The carrier virtual network system of claim 1 further comprising:
   a second portion of the layer one resources of the first telecommunication network dedicated to a second carrier virtual network; and
   a second network connection linking the second network to the second portion of the layer one resources of the first telecommunication network dedicated to the second carrier virtual network, the second telecommunication network accessing the second portion of layer one resources of the first telecommunication network through the second network connection.

3. The carrier virtual network system of claim 2 wherein the first network system manager identifies the second portion of layer one resources of the first telecommunication network dedicated to the second carrier virtual network to the second network system manager over the first dedicated connection.

4. The carrier virtual network system of claim 3 wherein:
   the first network system manager accesses the first portion of the layer one resources of second telecommunication network dedicated to the first carrier virtual network using the first network connection; and
   the second network system manager accesses the second portion of the layer one resources of the first telecommunication network dedicated to the second carrier virtual network using the second network connection.

5. The carrier virtual network system of claim 4 further comprising:
   a third telecommunication network, the third telecommunication network having a plurality of layer one resources;
   a third portion of layer one resources of the third telecommunication network dedicated to the first carrier virtual network;
   a third network connection linking the first telecommunication network to the third portion of the layer one resources of the third telecommunication network dedicated to the first carrier virtual network, the first telecommunication network accessing the third portion of the layer one resources of the third telecommunication network through the third network connection;
   a fourth portion of layer one resources of the third telecommunication network dedicated to the second carrier virtual network;
   a fourth network connection linking the second telecommunication network to the fourth portion of the layer one resources of the third telecommunication network dedicated to the second carrier virtual network, the second telecommunication network accessing the fourth portion of layer one resources of the third telecommunication network through the fourth network connection;
   a third network system manager that manages the third telecommunication network;
   a second dedicated connection between the first network system manager and the third network system manager; and
   a third dedicated connection between the second network system manager and the third network system manager;
   wherein the third network system manager identifies the third portion of layer one resources of the third telecommunication network dedicated to the first carrier virtual network to the first network system manager over the third dedicated connection;
   wherein the third network system manager identifies the fourth portion of layer one resources of the third telecommunication network dedicated to the second carrier virtual network to the second network system manager over the fourth dedicated connection;

wherein the first network system manager accesses the third portion of the layer one resources of the third telecommunication network dedicated to the first carrier virtual network using the third network connection; and wherein the second network system manager accesses the fourth portion of the layer one resources of the third telecommunication network dedicated to the second carrier virtual network using the fourth network connection.

6. A carrier virtual network system wherein a telecommunication network with access to a carrier virtual network may access the layer one resources of other telecommunication networks dedicated to that carrier virtual network, the carrier virtual network system comprising:

a plurality of participating telecommunication networks, each telecommunication network having a plurality of layer one resources;

a subset of the plurality of participating telecommunication networks that may access each carrier virtual network;

at least one portion of the layer one resources of at least one of the plurality of participating telecommunication networks dedicated to each carrier virtual network, wherein the dedicated layer one resources are freely accessible to the subset of the plurality of participating telecommunication networks that may access each carrier virtual network such that a network system manager that manages each of the plurality of telecommunications networks provisions the dedicated layer one resources as if part of the participating telecommunication network, the network system manager:

(1) maintaining information identifying each portion of the layer one resources dedicated to each carrier virtual network that is accessible by the subset of the plurality of participating telecommunication networks that may access each carrier virtual network in a resource allocation record;

(2) receiving a customer request to establish service; and (3) referencing the resource allocation record to ascertain that the customer request can be satisfied by utilizing the dedicated layer one resources, without engaging the network management system of the dedicating telecommunication network;

and a means for each of the subset of the plurality of telecommunication networks that may access a carrier virtual network to access each portion of layer one resources dedicated to that carrier virtual network.

7. The carrier virtual network system of claim 6 further comprising a dedicated connection between the network system managers of the telecommunication networks dedicating resources to a carrier virtual network and the network system managers of the telecommunication networks that may access that carrier virtual network.

8. The carrier virtual network system of claim 6 wherein the means for each of the subset of the plurality of participating telecommunication networks that may access a carrier virtual network to access each portion of layer one resources dedicated to that carrier virtual network comprises a network connection.

9. The carrier virtual network system of claim 6 wherein each portion of layer one resources dedicated to a carrier virtual network is allocated at a predetermined level of access.

10. The carrier virtual network system of claim 9 wherein the predetermined level of access at which each portion of layer one resources dedicated to a carrier virtual network may be different for each portion.

11. The carrier virtual network system of claim 6 wherein the subset of the plurality of participating telecommunication networks that may access each carrier virtual network comprises one telecommunication network that may access each carrier virtual network.

12. The carrier virtual network system of claim 11 wherein the portions of layer one resources dedicated to each carrier virtual network comprises a portion of layer one resources from each participating telecommunication network except the telecommunication network that may access that carrier virtual network.

13. A method for establishing carrier virtual networks from a portion of the layer one resources of a first telecommunication network managed by a first network system manager and a second telecommunication network managed by a second network system manager, the first telecommunication network and the second telecommunication network being connected by a network connection, the method comprising:

dedicating at least one portion of the layer one resources of the second telecommunication network to a first carrier virtual network, wherein the dedicated layer one resources of the second telecommunication network are freely accessible to the first telecommunications network such that the first network system manager provisions the dedicated layer one resources as if part of the first telecommunication network;

providing an indication of the dedicated layer one resources to a carrier virtual network system manager, wherein the carrier virtual network system manager receives information regarding the layer one resources dedicated to the first carrier virtual network from the second telecommunication network dedicating resources, maintains information regarding the layer one resources dedicated to the first carrier virtual network, and provides information regarding the dedicated layer one resources of the second telecommunication network to the first telecommunication network that may access the carrier virtual network;

identifying the at least one portion of layer one resources of the second telecommunication network dedicated to the first carrier virtual network to the first network system manager via the carrier virtual network system manager; and accessing the at least one portion of the layer one resources of the second telecommunication network dedicated to the first carrier virtual network by the first telecommunication network using the network connection.

14. The method for establishing carrier virtual networks of claim 13 wherein dedicating at least one portion of the layer one resources of the second telecommunication network to a first carrier virtual network further comprises:

dedicating a first portion of layer one resources of the second telecommunication network to a first carrier virtual network at a first level of access; and dedicating a second portion of layer one resources of the second telecommunication network to a first carrier virtual network at a second level of access.

15. The method for establishing carrier virtual networks of claim 14 wherein identifying the at least one portion of layer one resources of the second telecommunication network dedicated to the first carrier virtual network to the first network system manger further comprises:

the second network system manager identifying to the first network system manager the first portion of layer one resources of the second telecommunication network dedicated to the first carrier virtual network at a first level of access; and the second network system manager identifying to the first network system manager the second portion of layer one resources of the second telecommunication network dedicated to the first carrier virtual network at a second level of access.

16. The method for establishing carrier virtual networks of claim 13 further comprising:
dedicating at least one portion of the layer one resources of the first telecommunication network to a second carrier virtual network;
identifying the at least one portion of the layer one resources of the first telecommunication network dedicated to the second carrier virtual network to the second network system manager; and
accessing the at least one portion of the layer one resources of the first telecommunication network dedicated to the second carrier virtual network by the second telecommunication network using the network connection.

17. The method for establishing carrier virtual networks of claim 16 wherein dedicating at least one portion of the layer one resources of the second telecommunication network to a first carrier virtual network further comprises:
dedicating a first portion of layer one resources of the second telecommunication network to a first carrier virtual network at a first level of access; and
dedicating a second portion of layer one resources of the second telecommunication network to a first carrier virtual network at a second level of access.

18. The method for establishing carrier virtual networks of claim 17 wherein dedicating at least one portion of the layer one resources of the first telecommunication network to a second carrier virtual network further comprises:
dedicating a third portion of layer one resources of the first telecommunication network to a second carrier virtual network at a third level of access; and
dedicating a fourth portion of layer one resources of the first telecommunication network to a second carrier virtual network at a fourth level of access.

19. The method for establishing carrier virtual networks of claim 18 wherein:
identifying the at least one portion of layer one resources of the second telecommunication network dedicated to the first carrier virtual network to the first network system manager further comprises:
the second network system manager identifying to the first network system manager the first portion of layer one resources of the second telecommunication network dedicated to the first carrier virtual network at a first level of access; and
the second network system manager identifying to the first network system manager the second portion of layer one resources of the second telecommunication network dedicated to the first carrier virtual network at a second level of access; and wherein
identifying the at least one portion of the layer one resources of the first telecommunication network dedicated to the second carrier virtual network to the second network system manager further comprises:
the first network system manager identifying to the second network system manager the third portion of layer one resources of the first telecommunication network dedicated to the second carrier virtual network at a third level of access; and
the first network system manager identifying to the second network system manager the fourth portion of layer one resources of the first telecommunication network dedicated to the second carrier virtual network at a fourth level of access.

20. A method for establishing a plurality of carrier virtual networks from portions of the layer one resources of a plurality of telecommunication networks, each of the plurality of telecommunication networks being managed by a network system manager the method comprising:
dedicating portions of the layer one resources of the plurality of telecommunication networks to each of the plurality of carrier virtual networks, wherein the dedicated layer one resources of the plurality of telecommunication networks are freely accessible to each telecommunication network that may access the layer one resources dedicated to that carrier virtual network such that the network system manager can provision the dedicated layer one resources as if part of the first telecommunications network;
identifying the portions of layer one resources dedicated to each of the plurality of carrier virtual networks to the network system manager of each telecommunication network that may access the layer one resources dedicated to that carrier virtual network, the network system manager of each telecommunication network that may access the dedicated layer one resources:
(1) maintaining information identifying the portions of the layer one resources dedicated to each carrier virtual network that is accessible by the telecommunication networks that may access the layer one resources dedicated to the carrier virtual network in a resource allocation record;
(2) receiving a customer request to establish service; and
(3) referencing the resource allocation record to ascertain that the customer request can be satisfied by utilizing the dedicated layer one resources, without engaging the network management system of the dedicating telecommunication network; and
accessing the layer one resources dedicated to each of the plurality of carrier virtual networks by each telecommunication network that may access that carrier virtual network.

21. The method for establishing a plurality of carrier virtual networks of claim 20, wherein dedicating portions of the layer one resources of the plurality of telecommunication networks to each of the plurality of carrier virtual networks further comprises dedicating each portion of layer one resources to a carrier virtual network at a predetermined level of access.

22. The method for establishing a plurality of carrier virtual networks of claim 21, wherein identifying the portions of layer one resources dedicated to each of the plurality of carrier virtual networks comprises the network system manager of the telecommunication network dedicating the layer one resources identifying each portion of layer one resources within that telecommunication network dedicated to a carrier virtual network to the network system manager of each telecommunication network that may access that carrier virtual network.

23. The method for establishing a plurality of carrier virtual networks of claim 20 wherein accessing the layer one resources dedicated to each of the plurality of carrier virtual networks comprises the network system manager of each telecommunication network that may access a carrier virtual network accessing the portions of layer one resources dedicated to that carrier virtual network.

* * * * *